US006985496B2

(12) United States Patent
Miyamoto et al.

(10) Patent No.: US 6,985,496 B2
(45) Date of Patent: Jan. 10, 2006

(54) COMMUNICATION MANAGEMENT DEVICE AND COMMUNICATION MANAGEMENT METHOD

(75) Inventors: Takahisa Miyamoto, Ebina (JP); Tatsuya Watanuki, Ebina (JP); Kazuko Iwatsuki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 843 days.

(21) Appl. No.: 09/740,613

(22) Filed: Dec. 18, 2000

(65) Prior Publication Data

US 2001/0027489 A1    Oct. 4, 2001

(30) Foreign Application Priority Data

Jan. 25, 2000 (JP) .............................. 2000-016062

(51) Int. Cl.
*H04J 3/16* (2006.01)

(52) U.S. Cl. .................. 370/471; 370/470; 370/465

(58) Field of Classification Search ................ 370/470, 370/471, 474, 473; 709/203; 719/324
See application file for complete search history.

(56) References Cited

U.S. PATENT DOCUMENTS

| 5,850,526 A | * | 12/1998 | Chou ........................ 709/247 |
| 5,940,401 A | * | 8/1999 | Frazier et al. .............. 370/445 |
| 5,959,990 A | * | 9/1999 | Frantz et al. ............... 370/392 |
| 6,111,876 A | * | 8/2000 | Frantz et al. ............... 370/392 |
| 6,236,643 B1 | * | 5/2001 | Kerstein ..................... 370/254 |
| 6,563,793 B1 | * | 5/2003 | Golden et al. .............. 370/236 |
| 6,564,267 B1 | * | 5/2003 | Lindsay ...................... 709/250 |
| 6,747,978 B1 | * | 6/2004 | Lewallen et al. ........... 370/401 |

FOREIGN PATENT DOCUMENTS

JP    P2000-02602    1/2000

OTHER PUBLICATIONS

Lo, Selina. "Jumbo frames? Yes!", Alteon Networks, Network World Fusion Forum, 1998, pp 1-2.*
Dykstra, Phil. "Gigabit Ethernet Jumbo Frames, And Why you Should Care", WareOnEarth Communications, Inc., 1999, p 1-5.*
Evans, Shara. "Standards Watch: Jumbo Frames", Telsyte Telecommunications Research and Strategy, 1999, pp 1-5.*
Yasu et al. "Evaluation of Gigabit Ethernet with Quality of Service for Event Builder", IEEE Article, pp 433-436.*
"802.1 Q Standard Brings Uniform Model to VLANs" (Tech Brief), *3 COM*; from 3COM.com.
"Extended Frame Sizes for Next Generation Ethernets", (A White Paper) *Alteon Networks* pp 1-5 from: alteonwebsystems.com.
"Configuration Ethernet, Fast Ethernet, and Gigabit Ethernet Switching"; *Cisco Systems*, pp 1-14 from: cisco.com.
"Alteon 180 Web Switch Selectable 10/100/1000 MRPS Web Switches", from: Alteon WebSystems.com.

* cited by examiner

*Primary Examiner*—Frank Duong
*Assistant Examiner*—Michael J. Moore
(74) *Attorney, Agent, or Firm*—Townsend and Townsend and Crew LLP

(57)    ABSTRACT

The present invention provides techniques to increase the efficiency of communication between computer systems. One embodiment of the present invention provides a method for communicating a first information item having a first data length of a plurality of data lengths, from a first device to a second device via a local area network. The first data length is determined based on a first data length restriction of the second device. Another embodiment enables a high-speed transfer of a large volume of data on a server to another server, without stopping the communication between the server and a client. This embodiment uses the limitation on data length of the destination system to limit the length of the data sent by the source system. In addition while standard length data is exchanged between client and server, extended length data is exchanged between servers.

13 Claims, 37 Drawing Sheets

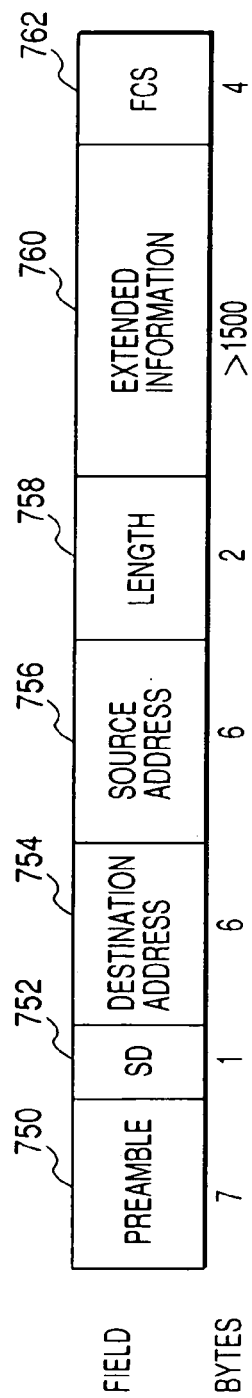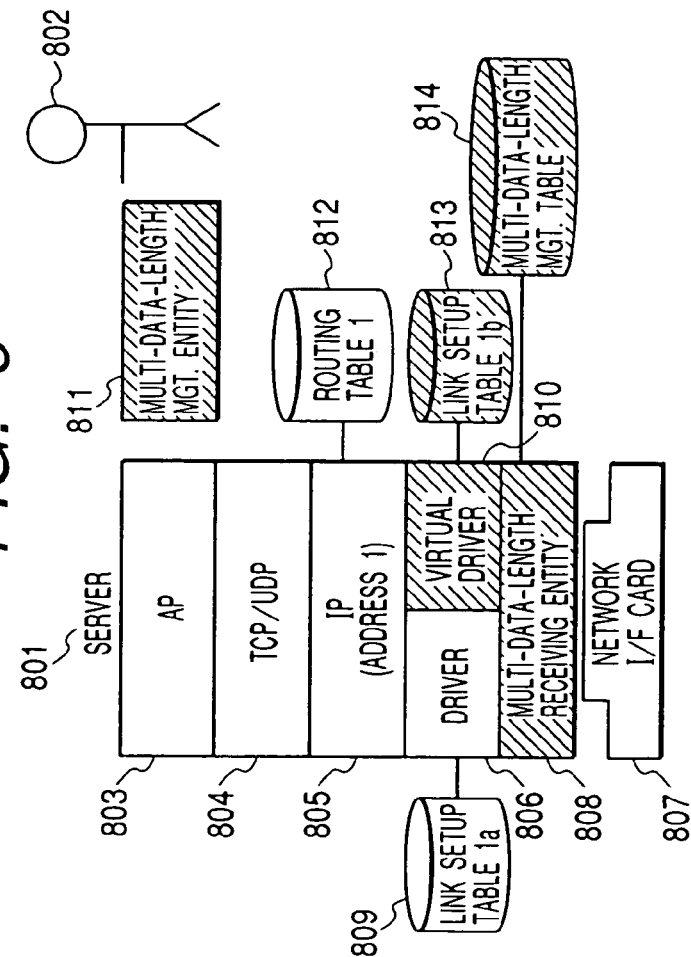

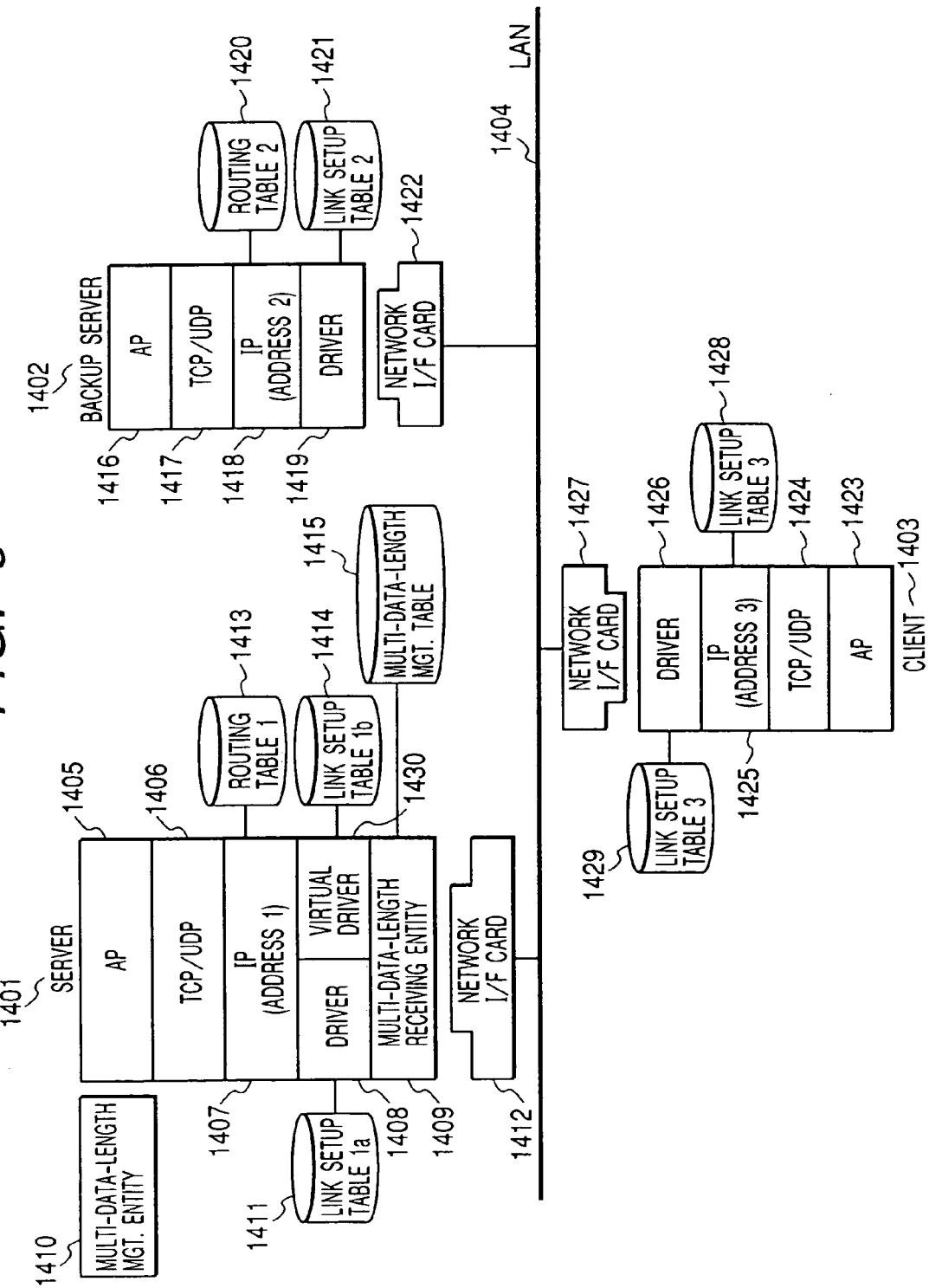

FIG. 10A

~1411
LINK SETUP TABLE 1a

| ADDRESS 1 | L1 | STATISTICS |
|---|---|---|
| 1501 | 1502 | 1503 |

FIG. 10B

~1414
LINK SETUP TABLE 1b

| ADDRESS 1 | L2 | STATISTICS |
|---|---|---|
| 1601 | 1602 | 1603 |

FIG. 10C

~1413
ROUTING TABLE 1      1702         1703                    1704      1705

| | | | | |
|---|---|---|---|---|
| ADDRESS 3 | ADDRESS 3 | SEND I/F WITH DRIVER | L1 | 1705 |
| ADDRESS 2 | ADDRESS 2 | SEND I/F WITH VIRTUAL DRIVER | L2 | 1706 |

~1415
MULTI-DATA-LENGTH MGT. TABLE                1804     1801

| ADDRESS 3 | L1 | SEND I/F WITH DRIVER |
|---|---|---|
| ADDRESS 2 | L2 | SEND I/F WITH VIRTUAL DRIVER |

~1421
LINK SETUP TABLE 2

| ADDRESS 2 | L2 | STATISTICS |
|---|---|---|
| 1901 | 1902 | 1903 |

FIG. 11B

~1420
ROUTING TABLE 2

| ADDRESS 1 | ADDRESS 1 | SEND I/F WITH DRIVER | L2 |
|---|---|---|---|
| 2001 | 2002 | 2003 | 2004 |

FIG. 11C

~1429
LINK SETUP TABLE 3

| ADDRESS 3 | L1 | STATISTICS |
|---|---|---|
| 2101 | 2102 | 2103 |

FIG. 11D

~1428
ROUTING TABLE 3

| ADDRESS 1 | ADDRESS 1 | SEND I/F WITH DRIVER | L1 |
|---|---|---|---|
| 2201 | 2202 | 2203 | 2204 |

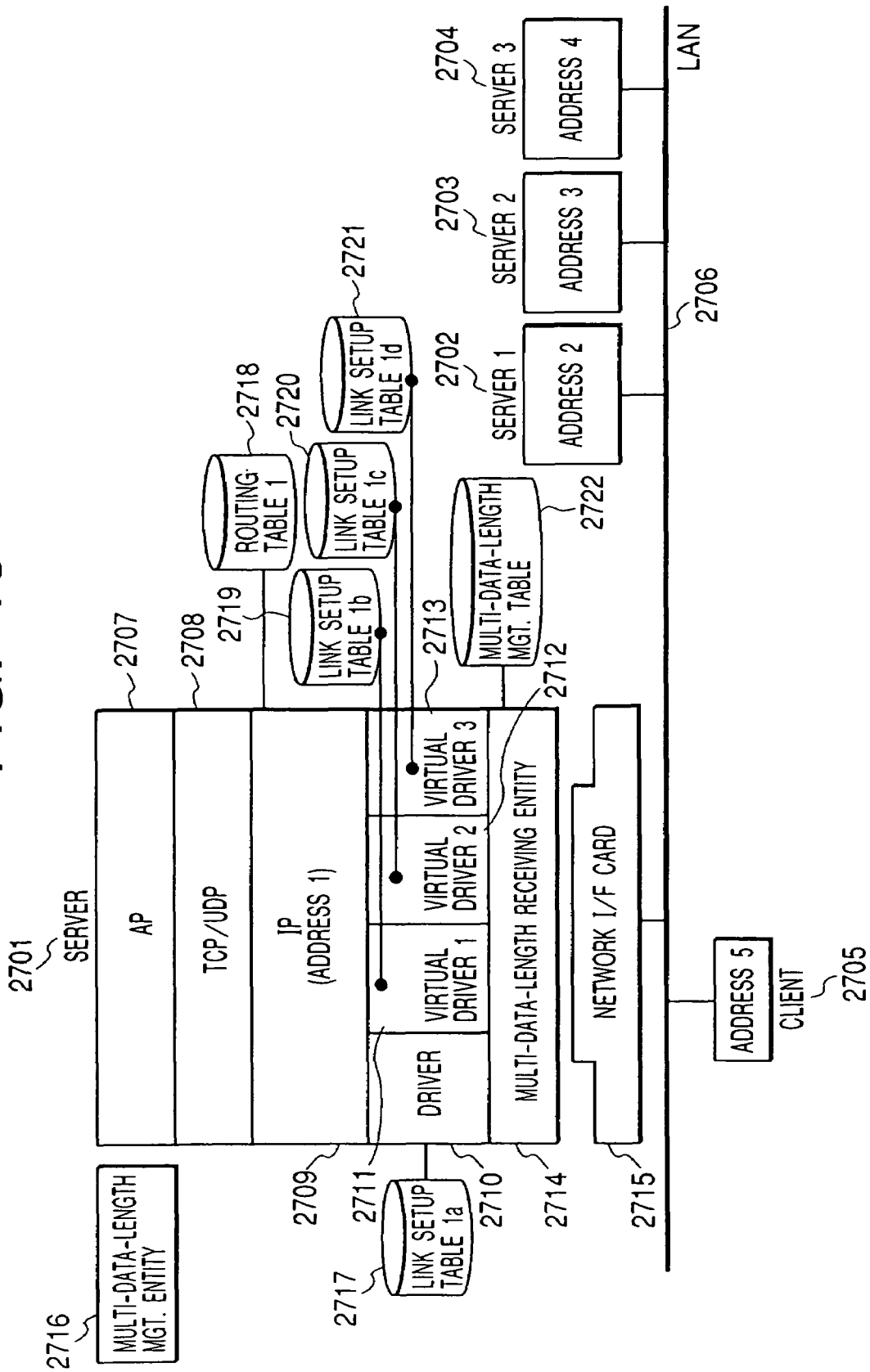

FIG. 18A

LINK SETUP TABLE 1c (2720)

| ADDRESS 1 | L3 | STATISTICS |
|---|---|---|
| 3101 | 3102 | 3103 |

FIG. 18B

LINK SETUP TABLE 1d (2721)

| ADDRESS 1 | L4 | STATISTICS |
|---|---|---|
| 3201 | 3202 | 3203 |

FIG. 18C

ROUTING TABLE 1 (2718)

| | | | |
|---|---|---|---|
| ADDRESS 5 | ADDRESS 5 | RECEIVE I/F WITH DRIVER | L1 |
| ADDRESS 2 | ADDRESS 2 | RECEIVE I/F WITH VIRTUAL DRIVER 1 | L2 |
| ADDRESS 3 | ADDRESS 3 | RECEIVE I/F WITH VIRTUAL DRIVER 2 | L3 |
| ADDRESS 4 | ADDRESS 4 | RECEIVE I/F WITH VIRTUAL DRIVER 3 | L4 |

FIG. 21A

_3424
LINK SETUP TABLE 2

| ADDRESS 2 | L2 → L3 | STATISTICS |
|---|---|---|
| 3601 | 3602 | 3603 |

FIG. 21B

_3423
ROUTING TABLE 2

| ADDRESS 1 | ADDRESS 1 | SEND I/F WITH DRIVER | L2 → L3 |
|---|---|---|---|
| 3701 | 3702 | 3703 | 3704 |

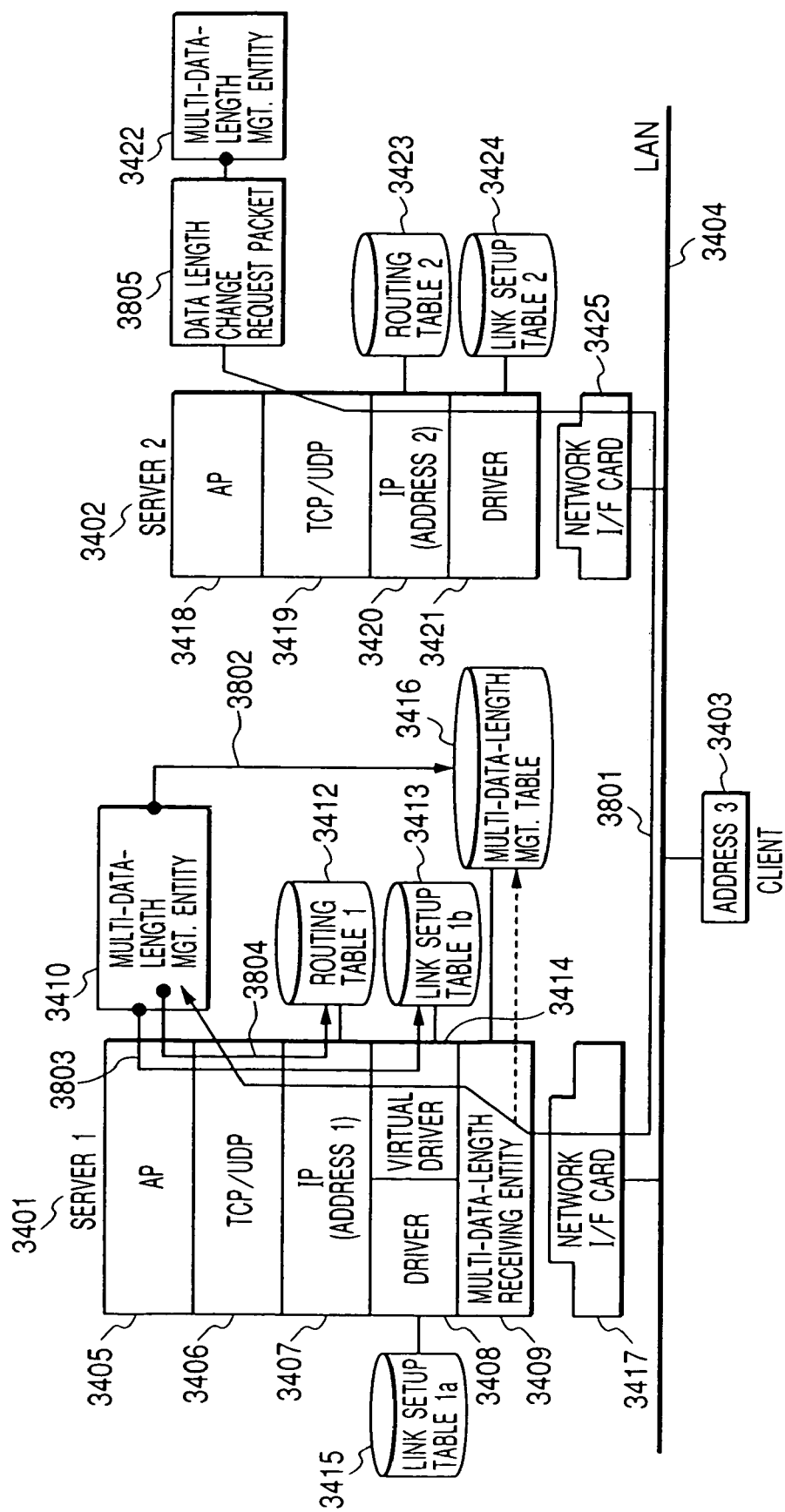

FIG. 23A

3413
LINK SETUP TABLE 1b

| ADDRESS 1 | L2 → L3 | STATISTICS |
|---|---|---|
| 3901 | 3902 | 3903 |

FIG. 23B

3412
ROUTING TABLE 1

| ADDRESS 3 | ADDRESS 3 | SEND I/F WITH DRIVER | L1 | ~4001 |
|---|---|---|---|---|
| ADDRESS 2 | ADDRESS 2 | SEND I/F WITH VIRTUAL DRIVER | L2 → L3 | ~4006 |
| 4002 | 4007 | 4008 | 4009 | 4010 |

3416
MULTI-DATA-LENGTH MGT. TABLE    4104

| ADDRESS 3 | L1 | SEND I/F WITH DRIVER | ~4101 |
|---|---|---|---|
| ADDRESS 2 | L2 → L3 | SEND I/F WITH VIRTUAL DRIVER | ~4105 |
| 4102  4106 | 4103  4107 | 4108 | |

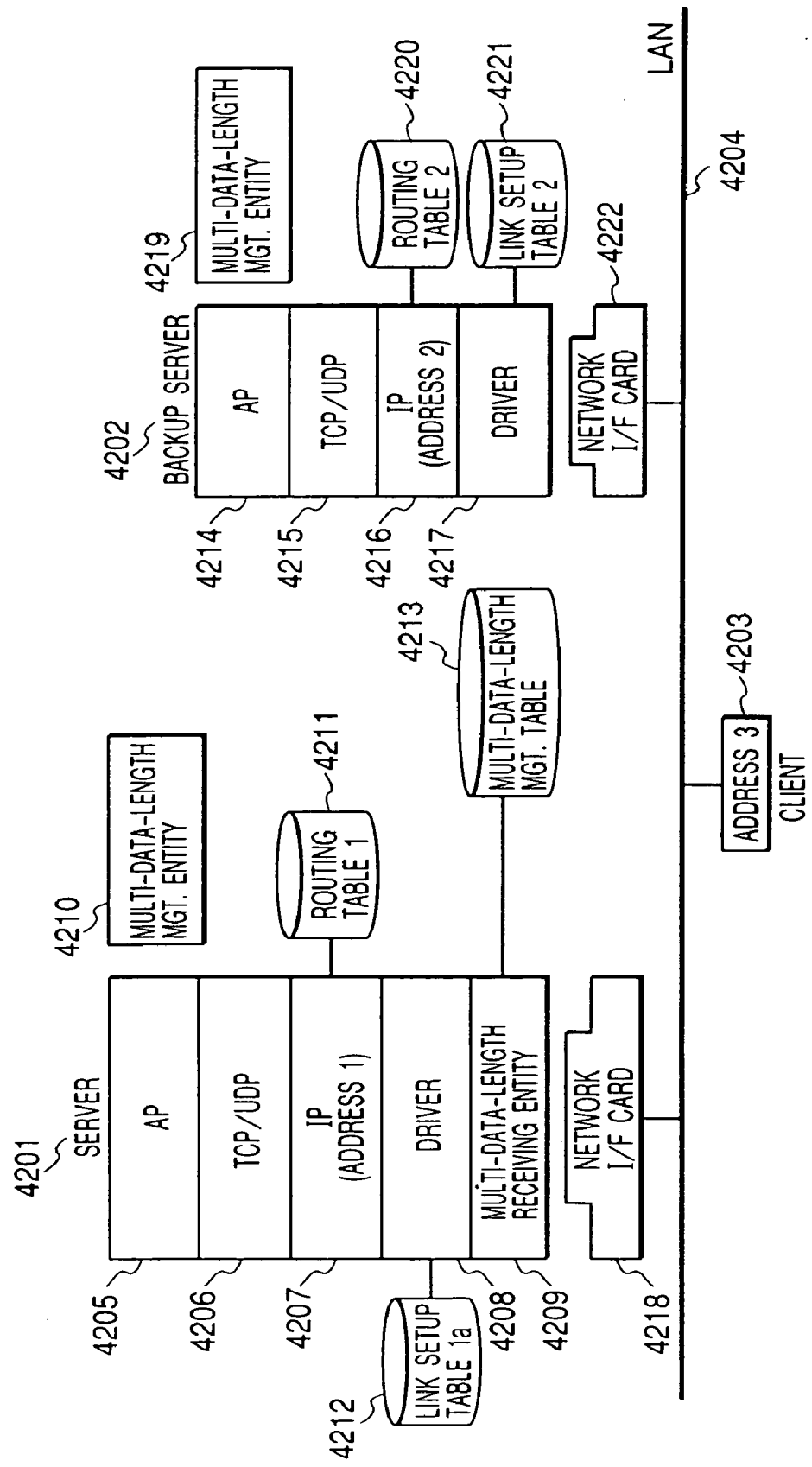

FIG. 25A

LINK SETUP TABLE 1a (4212)

| ADDRESS 1 | L1 | STATISTICS |
|---|---|---|
| 4301 | 4302 | 4303 |

FIG. 25B

ROUTING TABLE 1 (4211)

| ADDRESS 2 | ADDRESS 2 | SEND I/F WITH DRIVER | L1 | — 4401 |
|---|---|---|---|---|
| ADDRESS 3 | ADDRESS 3 | SEND I/F WITH DRIVER | L1 | — 4406 |
| 4402 / 4407 | 4408 | 4409 | 4410 | |

(4403, 4404, 4405 are column labels above)

FIG. 25C

MULTI-DATA-LENGTH MGT. TABLE (4213)

| ADDRESS 2 | L1 | SEND I/F WITH DRIVER | — 4501 |
|---|---|---|---|
| ADDRESS 3 | L1 | SEND I/F WITH DRIVER | — 4505 |
| 4502 / 4506 | 4503 / 4507 | 4508 | |

(4504 label)

FIG. 25D

LINK SETUP TABLE 2 (4221)

| ADDRESS 2 | L1 | STATISTICS |
|---|---|---|
| 4601 | 4602 | 4603 |

FIG. 25E

ROUTING TABLE 2 (4220)

| ADDRESS 1 | ADDRESS 1 | SEND I/F WITH DRIVER | L1 |
|---|---|---|---|
| 4701 | 4702 | 4703 | 4704 |

FIG. 27A

4221
LINK SETUP TABLE 2

| ADDRESS 2 | L1 → L4 | STATISTICS |
|---|---|---|
| 4901 | 4902 | 4903 |

FIG. 27B

4220
ROUTING TABLE 2

| ADDRESS 1 | ADDRESS 1 | SEND I/F WITH DRIVER | L1 → L4 |
|---|---|---|---|
| 5001 | 5002 | 5003 | 5004 |

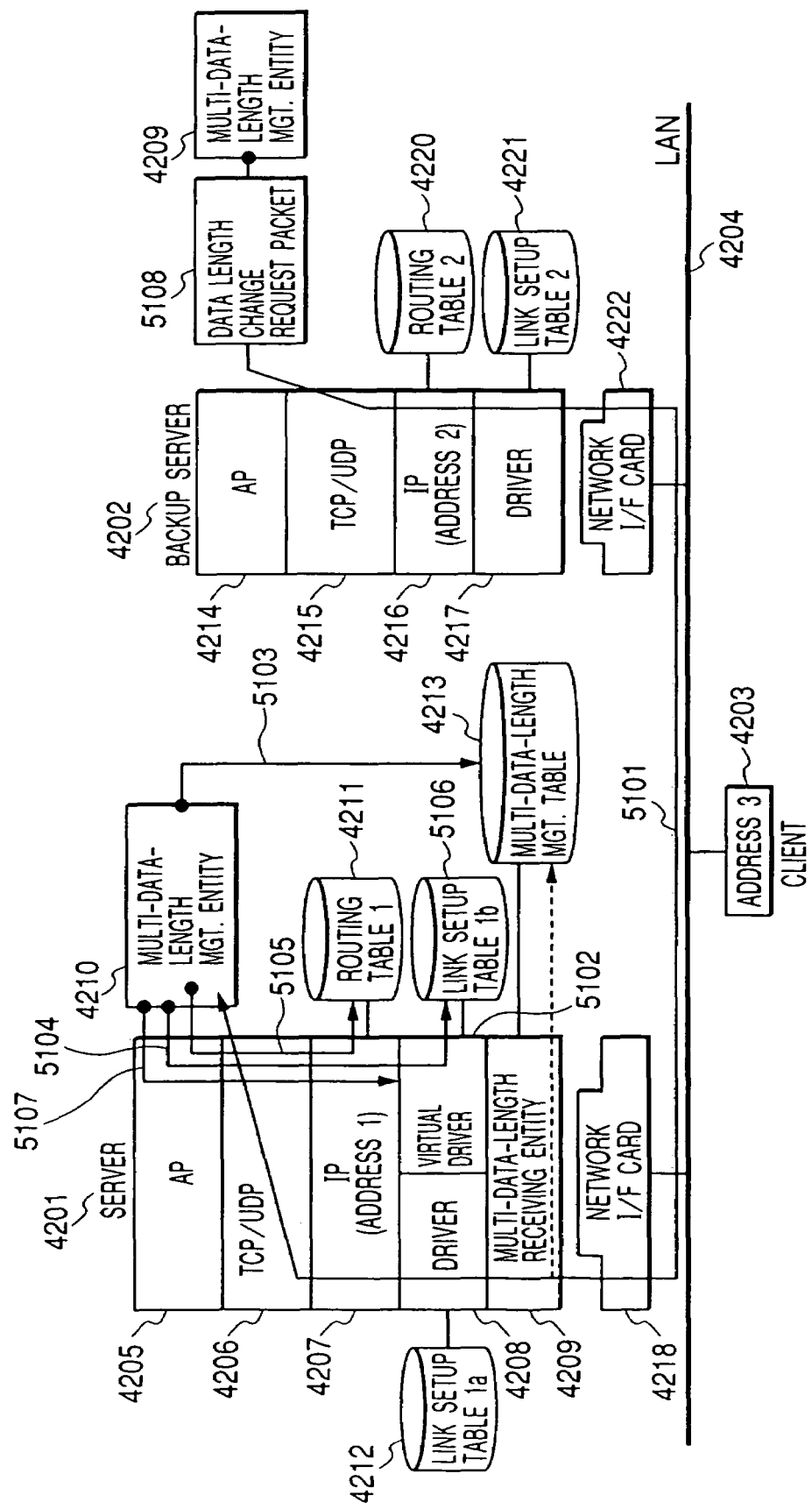

FIG. 29A

LINK SETUP TABLE 1b — 5106

| ADDRESS 1 | L4 | STATISTICS |
|---|---|---|
| 5201 | 5202 | 5203 |

FIG. 29B

ROUTING TABLE 1 — 4211

| 5302 | 5303 | 5304 | 5301 | 5305 |
|---|---|---|---|---|
| ADDRESS 2 | ADDRESS 2 | SEND I/F WITH DRIVER → SEND I/F WITH VIRTUAL DRIVER | | L1 → L4 |
| ADDRESS 3 | ADDRESS 3 | SEND I/F WITH DRIVER | | L1 |
| 5307 | 5308 | 5309 | 5306 | 5310 |

FIG. 29C

MULTI-DATA-LENGTH MGT. TABLE — 4213

| | | 5404 | 5401 |
|---|---|---|---|
| ADDRESS 2 | L1 → L4 | SEND I/F WITH DRIVER → SEND I/F WITH VIRTUAL DRIVER | |
| ADDRESS 3 | L1 | SEND I/F WITH DRIVER | |
| 5402  5406 | 5403  5407 | 5408 | 5405 |

FIG. 33A

MULTI-DATA-LENGTH MGT. TABLE ~5720

| ADDRESS 5 | L1 | SEND I/F WITH DRIVER | ~5801 |
| ADDRESS 6 | L1 | SEND I/F WITH DRIVER | ~5802 |
| ADDRESS 7 | L1 | SEND I/F WITH DRIVER | ~5803 |
| ADDRESS 2 | L2 | SEND I/F WITH VIRTUAL DRIVER | ~5804 |
| ADDRESS 3 | L2 | SEND I/F WITH VIRTUAL DRIVER | ~5805 |
| ADDRESS 4 | L2 | SEND I/F WITH VIRTUAL DRIVER | ~5806 |

FIG. 33B

MULTI-DATA-LENGTH MGT. TABLE ~5720

| ADDRESS 2 | L2 | SEND I/F WITH VIRTUAL DRIVER | ~5901 |
| ADDRESS 3 | L2 | SEND I/F WITH VIRTUAL DRIVER | ~5902 |
| ADDRESS 4 | L2 | SEND I/F WITH VIRTUAL DRIVER | ~5903 |

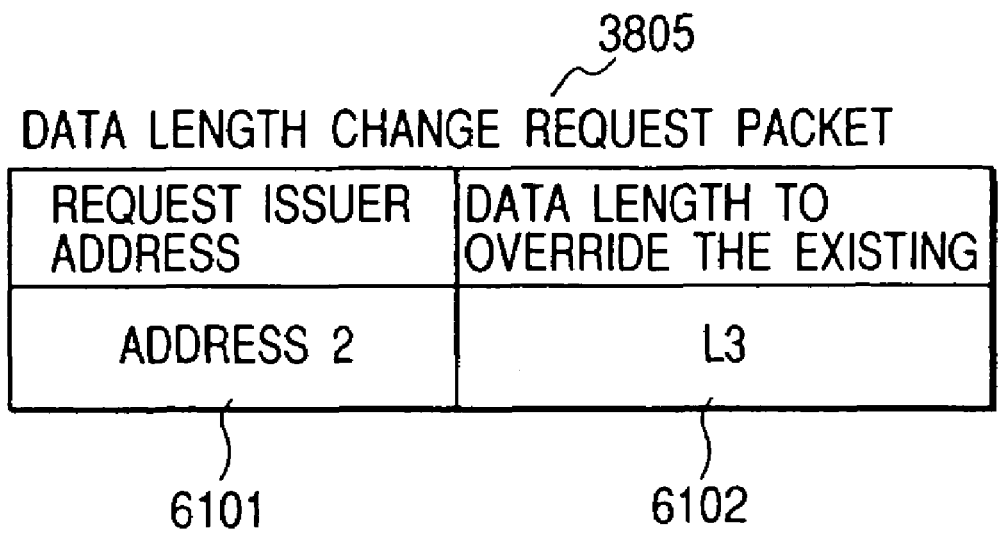
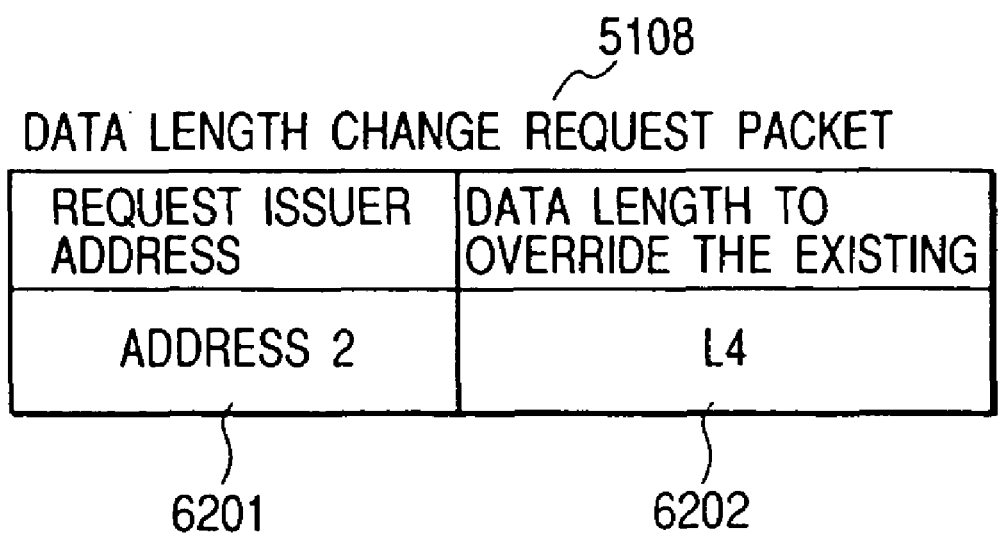

FIG. 37A

ROUTING TABLE 1 ~ 6411

| ADDRESS 3 | ADDRESS 3 | SEND I/F WITH DRIVER | L1 | ~ 6505 |
|---|---|---|---|---|
| ADDRESS 2 | ADDRESS 2 | SEND I/F WITH VIRTUAL DRIVER | L2 | ~ 6506 |

MULTI-DATA-LENGTH MGT. TABLE ~ 6413

| ADDRESS 3 | L1 | SEND I/F WITH DRIVER | ~ 6601 |
|---|---|---|---|
| ADDRESS 2 | L2 | SEND I/F WITH VIRTUAL DRIVER | ~ 6605 |

LINK SETUP TABLE 1a ~ 6412

| ADDRESS 1 | L1 | STATISTICS |
|---|---|---|

LINK SETUP TABLE 1b ~ 6424

| ADDRESS 1 | L2 | STATISTICS |
|---|---|---|

ROUTING TABLE 2 ~ 6420

| ADDRESS 1 | ADDRESS 1 | SEND I/F WITH DRIVER | L2 | ~ 6905 |
|---|---|---|---|---|

LINK SETUP TABLE 2 ~ 6421

| ADDRESS 2 | L2 | STATISTICS |
|---|---|---|

7001  7002  7003

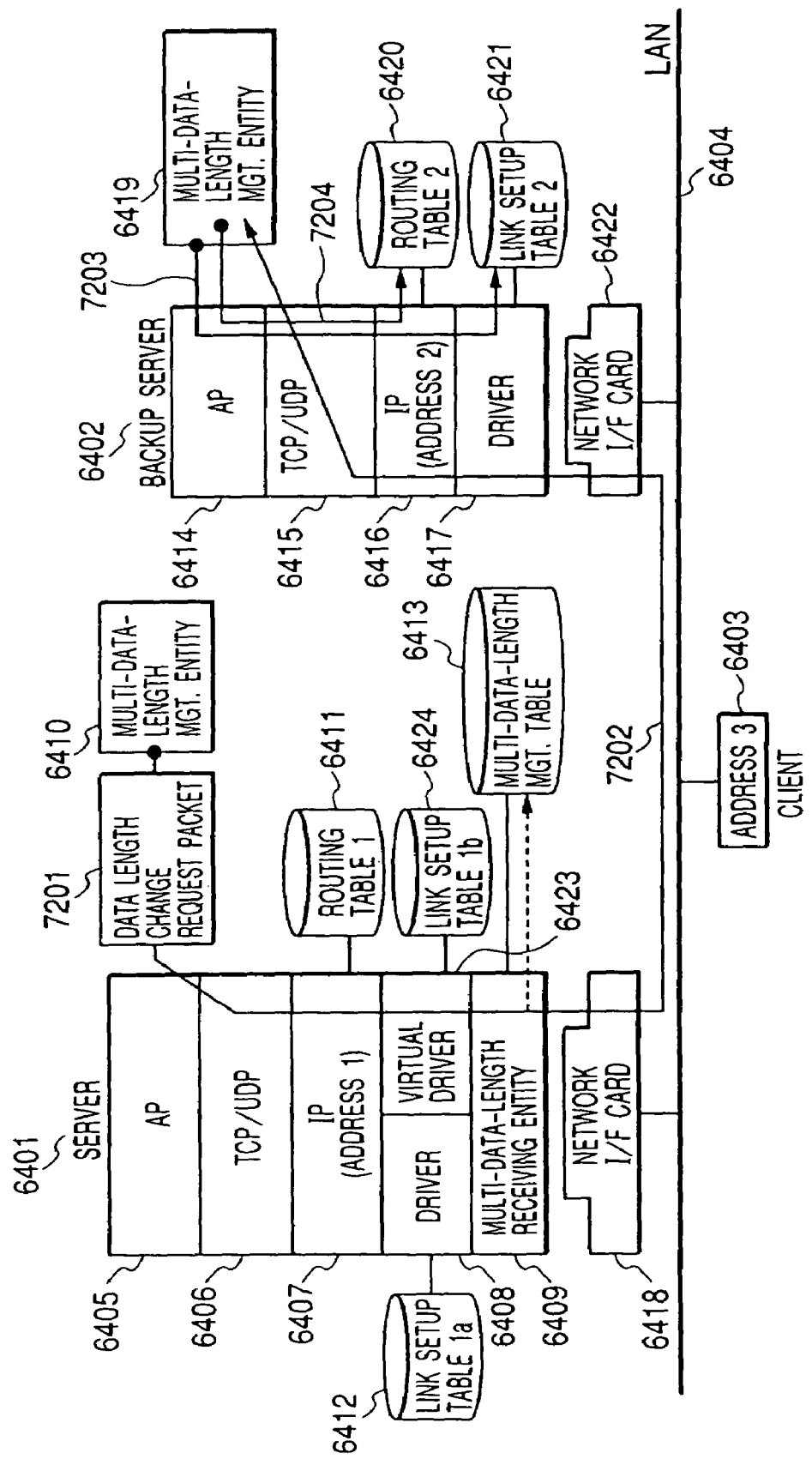

FIG. 40A

ROUTING TABLE 1 ~ 6411

| ADDRESS 3 | ADDRESS 3 | SEND I/F WITH DRIVER | L1 | ~6505 |
|---|---|---|---|---|
| ADDRESS 2 | ADDRESS 2 | SEND I/F WITH VIRTUAL DRIVER | L2→L1 | ~6506 |

MULTI-DATA-LENGTH MGT. TABLE ~ 6413      6604

| ADDRESS 3 | L1 | SEND I/F WITH DRIVER | ~6601 |
|---|---|---|---|
| ADDRESS 2 | L2→L1 | SEND I/F WITH VIRTUAL DRIVER | ~6605 |

LINK SETUP TABLE 1b ~ 6424

| ADDRESS 1 | L2→L1 | STATISTICS |
|---|---|---|
| 6801 | 7501 | 6803 |

FIG. 40D

ROUTING TABLE 2 ~ 6420

| ADDRESS 1 | ADDRESS 1 | SEND I/F WITH DRIVER | L2→L1 | ~6905 |
|---|---|---|---|---|
| 6901 | 6902 | 6903 | 7601 | |

FIG. 40E

LINK SETUP TABLE 2 ~ 6421

| ADDRESS 2 | L2→L1 | STATISTICS |
|---|---|---|
| 7001 | 7701 | 7003 |

FIG. 40F

DATA LENGTH CHANGE REQUEST PACKET ~ 7201

| REQUEST ISSUER ADDRESS | DATA LENGTH TO OVERRIDE THE EXISTING | |
|---|---|---|
| 7801~ | ADDRESS 1 | L1 | ~7802 |

COMMUNICATION MANAGEMENT DEVICE AND COMMUNICATION MANAGEMENT METHOD

CROSS-REFERENCES TO RELATED APPLICATIONS

This application is related to and claims priority from Japanese Patent Application No.2000-016062, filed on Jan. 25, 2000.

BACKGROUND OF THE INVENTION

The present invention relates generally to communication management devices and methods, and in particularly to communication management devices and methods for increasing the efficiency of data transfer between computer systems.

With the prevalence of LANs, network-based business and communication have become essential and are expected to spread increasingly for the future. On the other hand, the performance of personal computers (PCs) and workstations (WSs) has remarkably improved. The industry reports almost everyday about an enhanced operating frequency of a Central Processing Unit (CPU) and the release of a new model based on new architecture introduced into the market. In this situation, distributed processing of transactions by connecting a super-high-speed server and a low-price client via a high-speed network have become possible. Formerly, servers were expensive WSs, but recently, many low-price PCs have been used in many cases. The transmission rate of a typical network, for example, Ethernet (a registered trademark of Xerox Corp.), that is substantially regarded as a standard, has now increased to 100 megabits per second (Mbps), though it was 10 Mbps just several years before. Moreover, a network interface card for 1000 Mbps and a networking device to which the card is connected have been released.

A "maximum frame data length" for transmission on a line using, for example, an Ethernet protocol (Ethernet II or IEEE 802.3) is defined and communication using frames with frame data longer than this data length are not allowed for this protocol. The frames may be discarded by the receiver. FIG. 1 is a diagram showing a server and client system. If, for example, a client [102] and a server [101] shown in FIG. 1 are connected via a LAN [103], the server [101] first checks the maximum frame data length (L) defined for the LAN [103] protocol and then sends the data [104], based on the maximum frame data length (L) setting. This was required both in order to avoid data collision on the network and to enable communication with an old device with limited storage due to the high-price of memory devices in those days.

For example, FIG. 2 shows a format for the Ethernet protocol. There is an 8 byte preamble 110, a 6 byte destination address, which includes a machine address code (MAC), a source address 114 of the sender which includes the source MAC, a length/type 2 byte field 116, an information or user data field 118, and a Frame Check Sum (FCS) 120 of 4 bytes. The length/type field 116 may be the length in bytes (46 to 1500) of the information field 118 or it may be a type designator. The type field having value 0 to 05DC (hexadecimal) is from 0 to 1500. A value such as 8100 may mean a VLAN (IEEE 802.1Q) frame. The "maximum frame data length" (L) of the Ethernet protocol is 1514 bytes, which includes the destination address 112, source address 114, length/type 116, and information 118.

Using an Internet Protocol (IP) network model as an example and FIGS. 3 and 4 for reference, data transmission from a server to a client will be detailed below.

FIG. 3 is a schematic diagram showing the detailed structures of the server and the client and illustrating how the server and the client handle data (disassembling data into segments and reassembling the segments into data). FIG. 3 shows the structures of the server [101] and the client [102] and illustrates the data transmission between them with the data [201] being disassembled into segments of the maximum frame data length (L1) that is defined for a LAN [103] protocol. Explanation begins with the server structure. The server [101] is composed of modules arranged in hierarchical structure, having AP [202] on the top hierarchy and Transmission Control Protocol/User Datagram Protocol (TCP/UDP) [203], IP [204], a driver [205], and a network interface card [208] descending in the mentioned order. World Wide Web (WWW) and mail browser software may be typically used as the AP [202]. The TCP/UDP [203] are protocols for controlling data quantity to be transferred and assuring the reliability of data transfer and either TCP or UDP may be selectively used for any service of communication. The TCP/UDP [203] are typical protocols used for data communications over IP networks. Although there is difference between TCP and UDP, the combination of TCP/UDP means that either of TCP/UDP may be applied. Although the TCP/UDP [203] add a header to send data [201], the header is omitted in FIG. 2. The IP [204] carries out the following: computing an optimum route of data to be transferred (for example, determining the next networking device to which the server hands over the data), disassembling the data into segments of the maximum frame data length, generating headers required for data transfer and adding the headers to the data segments. Thus, the IP [204] holds a routing table [206] in which routing information is retained. Any networking device to which routing computation is to apply is assigned its identifier, namely its address per IP.

FIGS. 4A, 4B and 4C show the structures of a header, a routing table, and a link setup table.

FIG. 4A is a schema showing the structure of a header that the IP adds to a data segment. This schema represents a header [217] that the IP [204] generates and adds to a data segment. The header [217] includes a physical address that is assigned to each network interface card [208] to indicate the origin or destination of data to be transmitted over the LAN [103], a sender address [302] that is a virtual address (assigned to the above-mentioned IP [204]) to indicate the origin or destination of data to be transmitted over the LAN [103], a destination address [303], and information [304]. In the information field, a flag to indicate whether the data is disassembled, which will be described later, and a value that is used to check for destroyed data are stored. The physical address [301] is derived from the destination address [303] in an intermediate (sublayer) between the IP [204] and the driver [205] through the use of an Address Resolution Protocol (ARP) which is standardized by the Internet Engineering Task Force (IETF) and defined in Request for Comments (RFC) 826. For illustration purposes only, it is assumed that the sublayer is part of the IP [204] and that the IP also adds the physical address [301] to the header. The driver [205] is to control the network interface card [208] and one piece of the driver is required for one network interface card [208] or a plurality of network interface cards [208]. The driver [205] holds the information about the LAN

[103] as the link setup information. The link setup information is stored into a link setup table [207] and each driver holds this table.

FIG. 4B is a schema showing the structure of the routing table that the IP holds. This schema represents the routing table [206] into which routing information is stored. As shown, the routing table [206] may contain a plurality of sets of entries because the server is assumed to communicate with a plurality of other end devices. The routing table [206] contains the following entries: a destination address [401] of the other end of a communication path, a NextHop address [402] to indicate the next device to which the data is transmitted, an upward interface (interface is abbreviated to I/F hereinafter) with driver [403] to indicate an interface (generally, a function pointer) with a driver to be used to send the data, and data length [404] to indicate the maximum frame data length defined for the LAN to which the network interface card used by the driver is connected. The destination address [402] and the NextHop address [402] are addresses that are assigned to the above-mentioned IP [204]. The data length [404] is given in the way that the IP [204] reads the corresponding value in the link setup table [207] which will be described below and writes it into the routing table [206]. The above routing information may be given in ways; it may be either dynamically exchanged between networking devices or statistically set by a network administrator.

FIG. 4C is a schema showing the structure of the link setup table that the driver holds. This schema represents the link setup table [207] containing the following entries: device ID address [501] that is assigned to the IP [204] under which the driver [205] operates, data length [502] to indicate the maximum frame data length defined for the LAN [103] to which the network interface card [208] under the control of the driver [205] is connected, and statistics [503] such as the count of data sent and received though the driver [205]. The statistics [503] are updated when data is sent or received through the driver [205], whereas the remaining ones may be manually set or automatically written by loading the stored values from disk storage each time the device is booted. The network interface card [208] is needed for data sending and reception via the LAN [103] and is available with various types for the types of LAN [103].

On the other hand, the client [102] is also composed of corresponding modules arranged in similar hierarchical structure, having AP [209], TCP/UDP [210], IP [211], a driver [212], and a network interface card [213]. The IP [211] holds a routing table [218] and the driver [212] holds a link setup table [219]. In FIG. 2 the address assigned to the server [101] is marked address 1 and the address assigned to the client [102] address 2 for illustrative purposes. Address 1 is retained in the link setup table of the server and address 2 is retained in the link setup table of the client.

Next, actual data send/receive operation will be explained below. The maximum frame data length that is set for the LAN [103] is assumed to be L1. Data [201] generated by the AP [202] of the server [101] is delivered to the TCP/UDP [203] with the address information for the other end to which the data is to be transmitted being added thereto. Because the other end is the client [102] in the case of FIG. 2, the address information is address 2. The TCP/UDP [203] performs processing such as controlling the quantity of data to be transferred and adding a header to the data and then delivers the data [201] to the IP [204]. The IP [204] searches the routing table [206] with the search key of the address information given from the AP [202] in order to determine a route, thereby obtaining the NextHop address [402], upward I/F with driver [403] for the driver [205] to which the data [201] is to be delivered, and the data length [404]. Then, the IP [204] refers to the link setup table [207] held by the driver [205] via the upward I/F with driver [403] obtained as the result of the above search operation and thereby obtains data length [502]. The IP [204] compares two values of the obtained data length and selects the shorter data length as actual send data length and then disassembles the data [201] into segments of the selected length. In the case of FIG. 2, the server [101] and the client [102] are directly connected, and therefore the two values of the obtained data length are equal. For the case of FIG. 2, because the maximum frame data length set for the LAN [103] is L1, the actual send data length is L1. Note that the length of L1 includes the header [217]. For each of the data segments, the information that it is a segment into which the data has been disassembled is written into the information [304] field of the header. Specifically, the IP [204] disassembles the data into data 1 [214], data 2 [215] (each includes the header [217] and its data length is L1), and data 3 (which includes the header [217] and its data length is Ln) and delivers them to the driver [205]. Ln is the length of the last data segment remaining after the data is disassembled into the segments of L1 and varies depending on the original data length, but not exceeding the L1. If the last data is less than L1, the empty portion of its frame may be packed with any data so that the last data will meet the data length of L1. The driver [205] delivers each of the data segments delivered from the IP [204] to the network interface card [208] and issues a request to send to the network interface card [208]. The network interface card [208] transmits the data delivered thereto over the LAN [103], when the processing of the server [101] is complete.

The data received by the client [102] via the LAN [102] is delivered through the network interface card [213] and the driver [212] to the IP [211]. The IP [211] checks the information [304] field of the header of the received data, judges the received data to be a data segment of data, and waits for the arrival of the remaining part of the data. When all the data segments have arrived at the client [102], the IP [211] removes the headers [217] from these data segments, reassembles the segments into the whole data, and delivers the data to the TCP/UDP [210]. The TCP/UDP [210] delivers the data [201] to the AP [209], when the processing of the client is complete and a spell of data transfer operation between the server [101] and the client [102] terminates.

The following discusses the transmission of data whose length exceeds the maximum frame data length defined per LAN protocol, which is a better choice in some cases. Due to the prevalence of LANs and the diversification of the data transmitting over LANs, the "increase of the quantity of data to be transferred" over the LANs is significant. Specifically, this is because the communications using WWW and the transfer of picture and/or sound data has increased. During the time when data transferred via networks was mostly text data (in early 1990's and before), the quantity of the data to be transferred was on the order of hundreds of bytes to a few kilobytes. Because most of the data transferred was less than the maximum information length (1500 bytes) defined for Ethernet, it was not necessary to consider disassembling the data to be transferred into segments and the overhead accompanied by that. During the late 1990's, however, general users have enjoyed transmitting picture and/or sound data (megabytes of data) over networks and the problem of the maximum frame data length defined for the LANs has become evident. If, for example, data of one megabyte is transferred over the Ethernet (whose maximum information length=1500 bytes), the number of packets to be transmitted over Ethernet (the number is obtained by dividing the data to be transferred by the maximum information length) is:

$$N=1,000,000/1,500=\text{some } 666 \qquad (1)$$

On the other hand, the time taken for a device (PC, WS, router, etc.) that sends and receives data to process the data to be transferred, or in other words, CPU processing load (P) depends on the number of packets (N) and data length (L). P is given by:

$$P=a* N+b*L \text{(where a and b are device-dependent constants)} \qquad (2)$$

In equation (2), the length (L) of data to be transferred is constant (in the example, L=1 Meg), and independent of the maximum information length, whereas the number of packets (N) decreases if the maximum information length increases. In the case of the above data of one megabyte, by comparison with the number of packets (N) of about 666 represented in equation (1), the first term of equation (2), i.e., "a * N," can be reduced to about one by increasing the maximum information length to about 1 Meg, and consequently the CPU load (P) can be reduced to a great extent. Because a factor that determines constant a in equation (2) is receive interrupt processing that occurs whenever a frame arrives at the device, the constant a is generally greater for the receiving device. If a large volume of data, i.e., frames, arrives at the receiving end for a short time, the operation of the receiving device may fail in the worst case.

In the current circumstances where the transfer of a large volume of data is needed, extending the information length of a frame (for example, to 9000 bytes) over and above the maximum information length of a frame defined per LAN protocol (e.g., 1500 bytes for Ethernet) is very important and produces very beneficial results.

As another example of previous related technology, Alteon WebSystems, Inc., a network vendor of San Jose, Calif. has developed a network interface card and a LAN switch that can handle extended information length frames (called "jumbo frames") and supplies them to the market The frame sizing technology of Alteon will be discussed below. Ethernet and most of the other communication protocols have a predetermined "maximum frame data length" within which data transfer is possible. Thus, data longer than the "maximum frame data length" (such as image data on WWW data) must be disassembled into segments of "maximum length" at the sending terminal or at a networking device (router) between the sender and the recipient of the data. This disassembly of data, however, increases the "number of packets" that are transmitted over the lines and consequently the processing time for the data, which depends on the number of packets (such as interrupt processing to be handled by OS), also increases. Aiming at decreasing the processing load, Alteon extended the "maximum frame data length" assigned to lines using their proprietary technology. Thereby, specifically for the Ethernet lines, the frame information size of 1500 bytes is extended to 9000 bytes ("jumbo frame").

Following data frame extension, the other end of the transmission path to which the frame extension applies must be notified that the "maximum frame data length" has been extended. To implement this notification, Alteon uses "auto negotiation" provided as standard to its Ethernet equipment (partially implemented by its proprietary technology) (. If all devices on a physical line are Alteon devices, for example between a server and backup server with Alteon network cards then jumbo frames are exchanged. Both servers have their frames tagged (in accordance with IEEE 802.1Q) as belonging to the same Virtual LAN (VLAN). If there is a device with a network card that can only use standard frames, i.e., frames with equal to or less than the "maximum frame data length," for example, the typical PC LAN card, connected to a server with the Alteon card then standard frames are exchanged. This is a non-VLAN case. There is a problem in a mixed LAN with both VLAN and non-VLAN devices. For example, let a server and back-up server communicate by jumbo frames using VLAN and let the server communicate with a client using non-VLAN and a standard frame. While the server may transmit standard and jumbo frames over one physical line, this line must connect to an Alteon LAN switch, which then sends the frames to the back-up server or to the client. Thus there is a need for a simpler, less costly solution.

Cisco Systems, Inc., of San Jose, Calif. has also produced a LAN Switch (Catalyst 6000 Family,) which supports jumbo frames. Each port connected to a line may be set for either jumbo or standard but not both.

Thus there is a need for efficient techniques that have reasonable cost and that provide for high data transfer between servers, while providing for normal client-server communications on a LAN.

SUMMARY OF THE INVENTION

The present invention provides techniques to increase the efficiency of communication between computer systems. One exemplary embodiment provides for a high rate of information transfer between servers while providing for standard communication between a server and a client.

Another embodiment of the present invention provides a method for communicating a first information item having a first data length of a plurality of data lengths, from a first device to a second device via a local area network (LAN). The first data length is determined based on a first data length restriction of the second device; and then the first information item is sent to the second device over a link coupling the first device with the second device.

An embodiment of the present invention enables a high-speed transfer of a large volume of data on a server to another server, without stopping the communication between the server and a client. This embodiment uses the limitation on data length of the destination system to limit the length of the data sent by the source system. In addition while standard length data is exchanged between client and server, extended length data is exchanged between servers.

An embodiment of the invention provides for the selection of data length, according to the other end of a transmission path and makes it possible that a terminal communicates with different terminals, using different data lengths frames. The multi-data-length management entity sets or changes the data length for communication and the send interface with driver in a routing table and a link setup table and the data length for communication and the receive interface with driver in a multi-data-length management table. Referring to the routing table, the IP disassembles send data into given data length for communication, based on the destination address of send data. A selected driver or virtual driver transmits send data over a network, according to the set data length stored in the link setup table. The multi-data-length receiving entity receives data via a network, when it selects a receive interface with driver, based on the sender address, referring to the multi-data-length management table.

Another embodiment of the present invention, provides a communication management device having: a routing table into which the entries of destination address, data length for communication, and send interface with driver have been stored; a send data preparation entity that selects data length for communication and a send interface with driver provided for the data length, based on the destination address of send data, while referring to the routing table, and disassembles the send data, if necessary, into segments of selected data length for communication; a link setup table into which the entries of device ID address and data length for communication have been stored; a driver having a send interface with driver to transmit send data over a network, according to the data length for communication selected by the send data preparation entity and stored in the link setup table; and a multi-data-length management entity that sets or changes the data length for communication in the routing table and the data length for communication and the send interface with driver in the link setup table.

According to yet another embodiment of the present invention, the embodiment provides a communication management method in which: the multi-data-length management entity sets or changes the appropriate data length for communication in a table into which sets of the entries of destination address, data length for communication, and send interface with driver have been stored, the data length for communication in a link setup table into which the entries of device ID address and data length for communication have been stored, and the send interface with driver;

the multi-data-length management entity selects data length for communication and a send interface with driver provided for the data length, based on the destination address of send data, while referring to the table; and the send data is transmitted over a network through the use of the selected send interface with driver, according to the data length for communication stored in the link setup table.

In an embodiment of the present invention, the multi-data-length management entity, a multi-data-length receiving entity, and a multi-data-length management table are installed on an information system's terminal such as, for example, PC or WS (used as either a client or server). The multi-data-length management entity primarily has a set/entry section that accepts parameter settings input by a network administrator, a virtual driver creating section that creates a virtual driver for controlling the network interface card, a link setup table creating section that creates a link setup table to be held by the virtual driver, a multi-data-length management table creating section that creates a multi-data-length management table, a set/write section that writes settings into the link setup, routing, and multi-data-length management tables, a data length change request sending section that sends a request to change data length to the other end of a transmission path, and a data length change request receiving section that receives a request to change data length from the other end of a transmission path.

The multi-data-length receiving entity has a management table read section that reads stored information out of the multi-data-length management table, a receive data distributing section that distributes received data to the driver or one of the virtual drivers, according to the information read out of the multi-data-length management table, and a receive data buffer into which the received data is temporarily stored while reading of the multi-data-length management table is performed. The multi-data-length management table contains a plurality of sets of entries, each set having entries: a sender address that has been assigned to an information system's terminal from which data may be sent, data length that is the maximum frame data length for communicating with the terminal, and a downward I/F with driver that is the interface of a driver to which data received from the terminal is to be delivered.

These and other embodiments of the present invention are described in more detail in conjunction with the text below and attached figures.

BRIEF DESCRIPTION OF THE DRAWINGS

FIG. 5 shows a format for an extended frame of an embodiment of the present invention;

FIG. 6 is a schematic diagram showing the structure of a server of an embodiment of the present invention;

FIG. 9 is a diagram showing an example system model of an embodiment of the present invention, having a server, a backup server, and a client;

FIGS. 10A, 10B, 10C, and 10D show the structures of the link setup table-1a, link setup table-1b, routing table-1, and multi-data-length management table that are used in the system model shown in FIG. 9;

FIGS. 11A, 11B, 11C, and 11D show the structures of the link setup table-2, routing table-2, link setup table-3, and routing table-3 that are used in the system model shown in FIG. 9;

FIG. 16 is a diagram showing an example system model to which the present invention applies, having a server, three other servers, and a client;

FIGS. 18A, 18B, and 18C show the structures of the link setup table-1c, link setup table-1d, and routing table that are used in the system model shown in FIG. 16;

FIGS. 21A and 21B show the structures of the link setup table-2 and routing table-2 in FIG. 20;

FIG. 22 is a diagram that illustrates changing the existing data length setting on the server in the system model shown in FIG. 19;

FIGS. 23A, 23B, and 23C show the structures of the link setup table-1b, routing table-1, multi-data-length management table in FIG. 22;

FIG. 24 is a diagram showing the structures of a server and another server configured to enable data length addition;

FIGS. 25A, 25B, 25C, 25D, and 25E show the structures of the link setup table-1a, routing table-1, multi-data-length management table, link setup table-2, and routing table-2 in FIG. 24;

FIGS. 27A and 27B show the structures of the link setup table-2 and routing table-2 in FIG. 26;

FIG. 28 is a diagram that illustrates changing the existing data length information on the server in the system model shown in FIG. 24;

FIGS. 29A, 29B, and 29C show the structures of the link setup table-1b, routing table-1, and multi-data-length management table in FIG. 28;

FIGS. 33A and 33B show the structure of the multi-data-length management table into which all entries are registered and that into which only the entries about extended data length are registered in the system model shown in FIG. 32;

FIGS. 35A and 35B show the structure of a data length change request packet that is used to add another data length setting and the structure of the packet that is used to change the existing data length setting;

FIGS. 37A, 37B, 37C, 37D, 37E, and 37F show the structures of the routing table-1, multi-data-length management table, link setup table-1a, link setup table-1b, routing table-2, and link setup table-2 in FIG. 36;

FIG. 39 is a diagram illustrating the process of changing the existing data length setting on the backup server in the system model shown in FIG. 36; and FIGS. 40A, 40B, 40C, 40D, 40E, and 40F show the structures of the routing table-1, multi-data-length management table, link setup table-1b, routing table-2, link setup table-2, and data length change request packet in FIGS. 38 and 39.

DESCRIPTION OF THE SPECIFIC EMBODIMENTS

Figure 1:
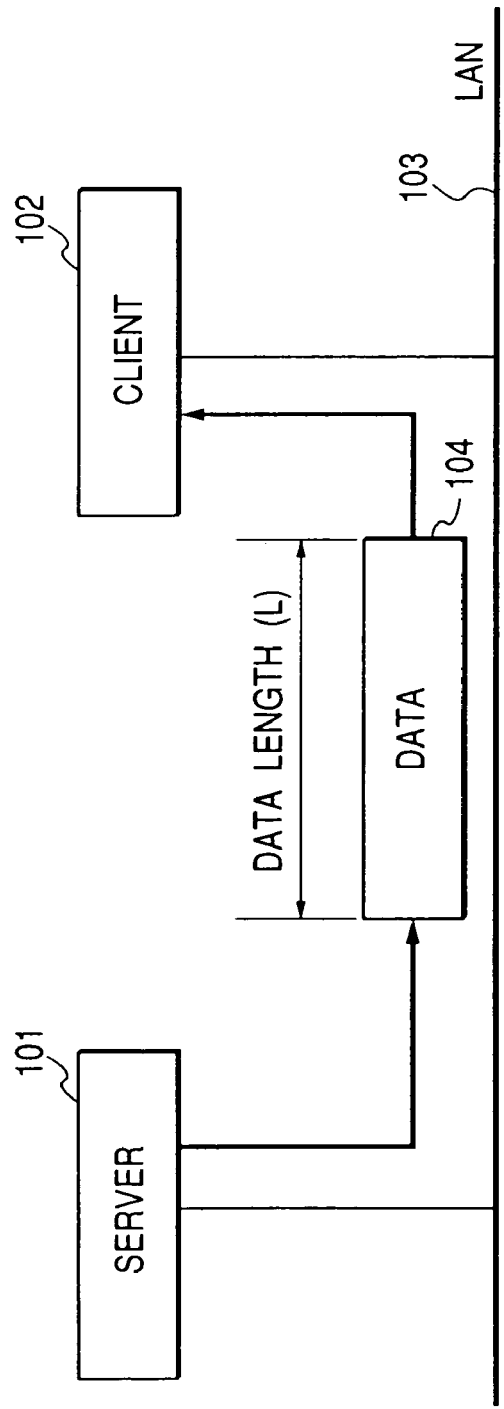
FIG. 1 is a diagram showing a server and client system.

With reference to the drawings, embodiments of the present invention are explained below.

In conventional networking, the maximum frame data length permitted to be sent and received over a LAN line such as Ethernet line was defined in advance. Thus, a data length change according to the destination end of a transmission path was difficult. If send data is longer than the maximum frame data length, the data sending device disassembled the send data into segments of the maximum frame data length.

In addressing the above issue, an embodiment of the present invention provides communication in different modes of multiple data length settings from which data length can be selected, according to the other end of a transmission path. The embodiment is not based on the previous methods of dividing a LAN and networking via a router. While Alteon's "auto negotiation" functions on a "line-by-line basis, the embodiment sets transfer data size on a "terminal-by-terminal" or device-by-device" basis.

The invention is to be applied to not only information systems' terminals such as Personal computers (PCs) and workstations (WSs), but also networking devices such as routers and LAN switches.

In further detail, one embodiment of the present invention provides one or more of the following:

(1) that a plurality of terminals or devices connected to a single LAN communicate with each other in different modes of multiple data length settings.

(2) that during the communication in a predefined standard data length mode, extended data length may be set for a terminal-to-terminal or device-to-device communication path and communication in the extended data length mode can be accomplished on the path.

(3) that during the communication in preset extended data length mode, another extended data length may be set for a terminal-to-terminal or device-to-device communication path and communication in another extended data length mode can be done.

(4) that extended frames, similar to jumbo frames, may be used between devices on a LAN, thus increasing the data transfer efficiency, reducing the count of receive notification to be posted from the network interface card to the driver on the receiving end, and decreasing the load on the receiving terminal or device.

For illustration purposes only, embodiments of the invention will be discussed below on the assumption that they are implemented on IP networking which is used for the Internet. In the following explanation, TCP/UDP protocols (either TCP or UDP) that are most generally used for data communication over IP networks are used as examples of the protocol over the IP. However, the present invention is not so limited and can be applied to other suitable networks and protocols, for example IPX, OSI, and the like.

Explanation begins with a diagram showing the structure of a server to which an embodiment of the present invention is applied. To simplify the explanation, it is assumed that the server communicates with one device in extended data length mode and another device in the standard data length mode. Extended data length means data length longer than the maximum frame data length defined for a LAN protocol. For example, for Ethernet, a maximum frame data length of 1514 bytes is defined for a data frame having a Media Access Control (MAC) header and Application (AP) data, excluding Frame Check Sequence (FCS). Longer than this frame size is extended data length (for example, 16 kilobytes).

FIG. 5 shows a format for an extended data frame of one embodiment of the present invention. A frame used may be similar to the IEEE 802.3 standard. The preamble 750 is a bit pattern for synchronization and is 7 bytes. The next 1 byte SD (Start Delimiter) 752 is a bit pattern indicating the start of a frame. The destination address 754 and Source address 756 may include their respective MAC addresses. The Length 758 is the length of the extended information field 760. And FCS 762 is the Frame Check Sum 762. The two major differences between a standard frame and this embodiment of an extended data frame is first, that the length field 758 is greater than 1500, i.e., a range from 05DD to FFFF hexadecimal. And second, the corresponding Extended information field 760 has this extended data length. For Ethernet, since the FCS 762 uses a 32 bit Cyclic Redundancy Code (CRC) to detect errors, about 11 Kbytes is the maximum extended length to maintain the same probability of undetected errors. In addition the extended information 760 and FCS 762 should be bit or character stuffed to remove any SD 752 patterns. Thus FIG. 6A has a format the same as the standard Ethernet format when the Length is in the range 0–1500 and can be received by standard PC Ethernet cards. When the Length 758 is greater than 1500, part of this extended frame (750, 752, 754, 756, 758, and 1500 bytes of 760) is discarded when received by the standard Ethernet card. The rest of the extended information and FCS is ignored as the Ethernet card listens for another SD.

FIG. 6 is a schematic diagram showing the structure of a server of an embodiment of the present invention. The server [801] includes modules arranged in hierarchical structure, having AP [803] on the top hierarchy and a multi-data-length management entity [811], TCP/UDP [804], IP [805], a driver [806], virtual driver [810], a multi-data-length receiving entity [808], and a network interface card [807] descending in the mentioned order. Among these modules, the AP [803], TCP/UDP [804], IP [805], driver [806], and network interface card [807].

The driver 806 is software that includes the receiver functions of buffering the incoming data, checking the destination address and checking the data length. For Ethernet, the buffer has space for the maximum frame data length (1514 bytes). The destination address should be the server (801), otherwise the frame is discarded. The data length should be from hexadecimal 0000 to 05DC (1500 decimal). Thus this driver 806 is for the standard Ethernet frame. Sender functions include sending a send request to the network card upon receiving a frame for transmission to the destination address from the IP 805.

The virtual driver 810 is for sending and receiving extended data frames. It has functions similar to the driver 806, except the information and information length are of the extended size. This means, for example, that the buffer size must be larger to accommodate the extended frame.

The network card 807 is special Ethernet card that can communicate both standard and extended frames. In one embodiment the special card may be a standard Ethernet card that has its memory expanded to handle the increased information length. For a received frame, the multi-data length receiving entity 808 determines what data length frame, standard or extended, it is. For sending a frame, either the driver 806 for standard frames or the virtual driver 810 for extended frames, tells the network card 808 the frame (standard or extended) to send.

Figure 7A:
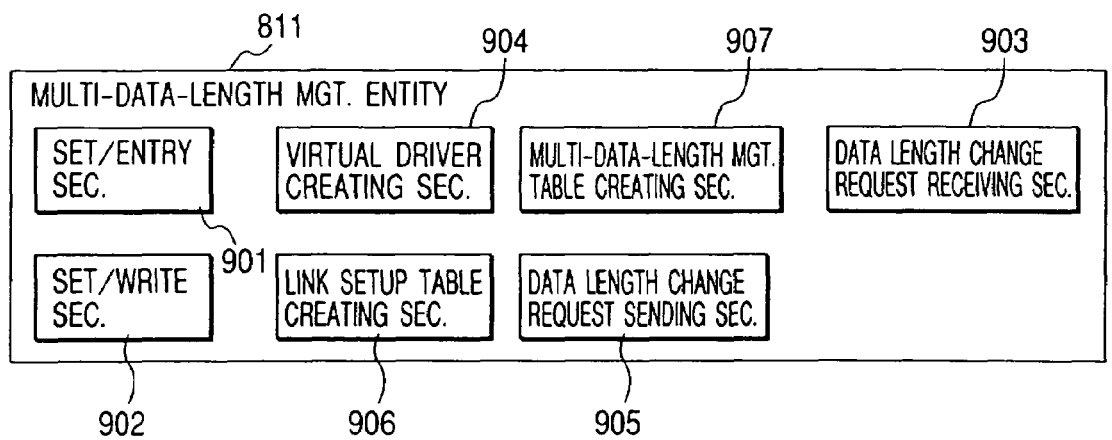
FIGS. 7A, 7B, and 7C show the structures of the multi-data-length management entity, multi-data-length receiving entity, and multi-data-length management table of an embodiment of the present invention.

FIG. 7(A) is a diagram showing the structure of the multi-data-length management entity of an embodiment of the invention. Using FIG. 7(A), the structure of the multi multi-data-length management entity [811] is described below. The multi-data-length management entity [811] has a set/entry section [901] that accepts the entry of kinds of parameters that are set by a network administrator [802], a virtual driver creating section [904] that creates a virtual driver [810] for controlling the network interface card [807], a link setup table creating section [906] that creates a link setup table-1b [813] which the virtual driver [810] holds, a multi-data-length management table creating section [907] that creates a multi-data-length management table [814], a set/write section [902] that writes required information into the link setup table-1b [813], routing table [812], and multi-data-length management table [814], a data length change request sending section [905] that sends a request to change data length to the other end of a transmission path, and a data length change request receiving section [903] that receives a request to change data length from the other end of a transmission path.

If UNIX OS is used, a virtual driver 810 can be created by using a standard tool of the UNIX OS. The virtual driver 810 is created similar to the driver 806, which is the standard Ethernet driver. The virtual driver creating section 904 of the multi-data-length management entity 811 allocates storage space for a virtual driver. In the storage space, a program for operating the virtual driver and a link setup table to be held by the virtual driver are installed. The storage space allocation is performed through the use of a function of the OS (a MALLOC (Memory Allocation) system call in the case of the UNIX OS). Once storage space allocation has been completed, the above-mentioned virtual driver program and link setup table are installed in the storage space, and creating the virtual driver is complete.

The IP [805] is assigned an identifier that identifies an information system's terminal on which it is installed, for example, address 1. The IP [805] holds the routing table into which information is stored to execute routing computation by using the address. The driver [806] holds a link setup table-1a [809] into which information is stored such as the maximum frame data length defined for a line to which the network interface card [807] is connected. The virtual driver [810] holds the link setup table-1b [813] into which similar information is stored such as the maximum extended data length. Because a single setting of extended data length applies for illustrative purposes in this embodiment, the server includes a single virtual driver [810] and a single link setup table-1b [813]. However, the number of virtual drivers and associated link setup tables can be set appropriately, according to the number of data length settings.

Figure 7B:
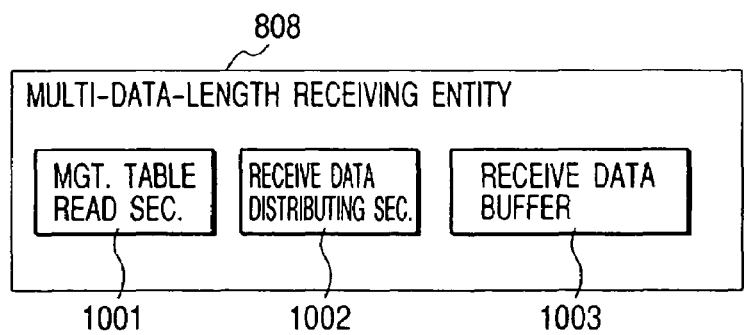

FIG. 7(B) is a diagram showing the structure of the multi-data-length receiving entity of an embodiment of the invention. Using FIG. 7(B), the structure of the multi-data-length receiving entity [808] is described below. The multi-data-length receiving entity [808] has a management table read section [1001] that reads stored information out of the multi-data-length management table [814], a receive data distributing section [1002] that distributes received data to either the driver [806] or the virtual driver [810], based on the information read from the multi-data-length management table [814], and a receive buffer [1003] into which the received data is temporarily stored while reading of the multi-data-length management table [814] is performed.

Figure 7C:
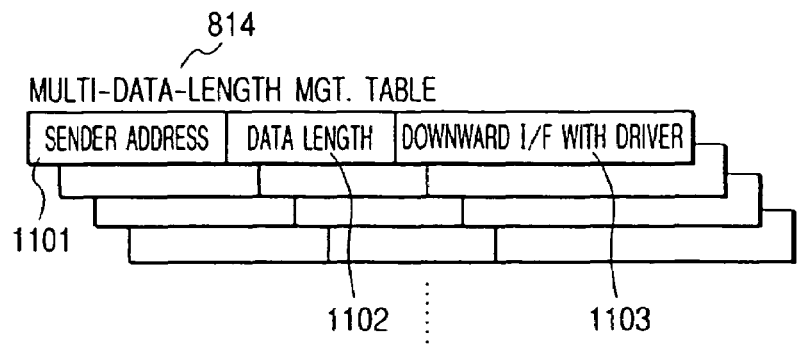

FIG. 7(C) is a diagram showing the structure of the multi-data-length management table of an embodiment of the invention. Using FIG. 7(C), the structure of the multidata-length management table [814] is described below. The multi-data-length management table [814] contains a plurality of sets of entries, each set having entries: a sender address [1101] that has been assigned to an information system's terminal from which data may be sent, data length [1102] that is the maximum frame data length for communicating with the terminal, and a downward I/F with driver [1103] that is the interface of a driver to which data received from the terminal is to be delivered.

Figure 8A:
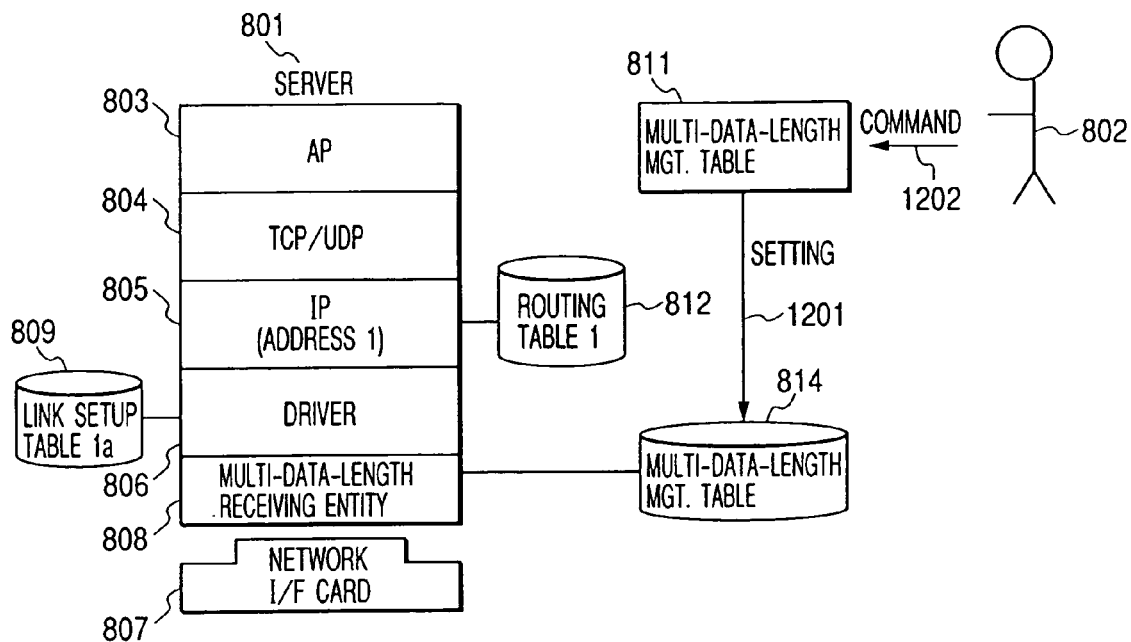
FIGS. 8A and 8B, illustrate the writing of settings into the multi-data-length management, routing, and link setup tables.
Figure 8B:
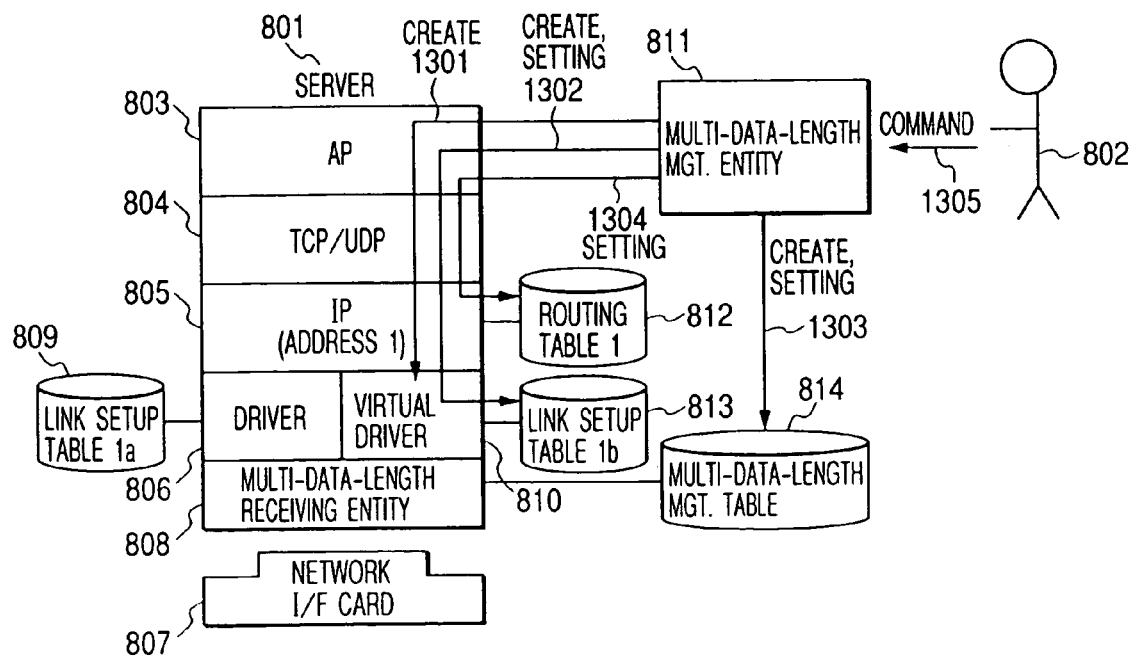

Then, the following discusses the internal operation of the server, using FIGS. 8A and 8B.

FIG. 8(A) is a schematic diagram illustrating the writing of settings into the multi-data-length management table. FIG. 8(A) depicts the writing process immediately after the server [801] starts up. The multi-data-length receiving entity [808] and the multi-data-length management table [814] are required for standard data length and extended data length. Thus, the above entity and table must have been generated as part of the Operating System (OS) or the network administrator [802] must integrate them into the OS by using an installer tool (supplied by Windows) in the same way as for a device driver of Windows (a registered trademark of Microsoft Corp.). The network administrator [802] issues a command [1202] for the multi-data-length management entity [811] to write further settings besides standard data length into the multi-data-length management table [814]. When the set/entry section [901] of the multi-data-length management entity [811] accepts the command [1202], the set/write section [902] of the multi-data-length management entity [811] writes [1201] the settings (such as extended data length and the address of the other end of the communication path on which data of extended length is transmitted) into the multi-data-length management table [814]. This writing is executed via a device driver (provided by the OS) that permits the access to storage in which the multi-data-length management table [814] is actually installed.

Next, FIG. 8(B) is a schematic diagram illustrating the writing of extended data settings into the routing table and the link setup table. The network administrator [802] issues a command [1305] for the multi-data-length management entity [811] to create a virtual driver [810]. When the set/entry section [901] of the multi-data-length management entity [811] accepts the command [1305], the virtual driver creating section [904] thereof creates a virtual driver [810] in the same hierarchy where the driver [806] exists via a driver create AP tool (supported as one of standard tools that the AP [803] has) [1301]. Then, the network administrator [802] issues a command [1305] for the multi-data-length management entity [811] to create a link setup table-1*b* [813] and write settings into the table. When the set/entry section [901] of the multi-data-length management entity [811] accepts the command [1305], the link setup table creating section [906] of the multi-data-length management entity [811] creates a link setup table-1 *b* [813] on the virtual driver [810] via a link setup table create AP tool (supported as one of standard tools that the AP [803] has) and the set/write section [902] writes [1302] the settings (such as extended data length) into the link setup table-1*b* [813] via a link setup table write AP tool (supported as one of standard tools that the AP [803] has). Then, the network administrator [802] issues a command [1305] for the multi-data-length management entity [811] to write settings into the routing table-1 [812]. When the set/entry section [901] of the multi-data-length management entity [811] accepts the command [1305], the set/write section [902] of the multi-data-length management entity [811] writes [1304] the settings (such as extended data length) into the routing table [812] via a routing table write AP tool (one of standard tools that the AP [803] has). Finally, the network administrator [802] issues a command [1305] for the multi-data-length management entity [811] to create a multi-data-length management table [814] and write settings into the table. When the set/entry section [901] of the multi-data-length management entity [811] accepts the command [1305], the multi-data-length management table creating section [907] of the multi-data-length management entity [811] creates a multi-data-length management table [814] and the set/write section [902] writes [1303] the settings (such as extended data length and the address of the other end of the communication path on which data of extended length is transmitted) into the created multi-data-length management table [814].

Next, an example of operation based on the invention will be explained, using a configuration model having a server [1401] for which extended data length is assumed to have been set as explained for FIG. 8B, a client [1403] that performs standard data length communication with the server [1401] using a standard PC LAN card, and a backup server [1402] that periodically backs up of a large volume of data retained on the server [1401], and using FIGS. 9, 10, 11, 12, 13, 14, 15, and 7(B).

FIG. 9 is a diagram showing an example system model of an embodiment of the present invention, having a server, a backup server, and a client. Using FIG. 9, the system structure will be described below. The server [1401], which may be, for example, a WWW server, a mail server, or a file server, will usually communicate with the client [1403] via a LAN [1404]. The client [1403] issues a request for service to the server [1401] via the LAN [1404] and receives the service. The backup server [1402] periodically backs up the data on the server [1401] via the LAN [1404]. The standard data length defined for the LAN [1404] is assumed to be L1 in this example. It is assumed that the communication between the server [1401] and the client [1403] is performed in standard data length (L1) mode and the communication between the server [1401] and the backup server [1402] is performed in extended data length (L2) mode.

Then, the structures of the server, backup server, and client will be explained below, using FIGS. 9, 10, and 11. As shown in FIG. 9, the server [1401] is composed of modules arranged in hierarchical structure, having AP [1405] on the top hierarchy and a multi-data-length management entity [1410], TCP/UDP [1406], IP [1407], a driver [1408], a virtual driver [1430], a multi-data-length receiving entity [1409], and a network interface card [1412] descending in the mentioned order (for the details of the modules, refer to the description of the overall structure diagram using FIG. 6). The IP [1407] holds a routing table-1 [1413] and is assigned address 1. In the example of Ethernet, the network interface card 1412 is a special card that is able to both transmit and receive standard and extended data frames.

The driver [1408] that is used for communication in standard data length mode holds a link setup table-1*a* [1411]. FIG. 10(A) shows the structure of the link setup table-1*a* [1411]. The link setup table-1*a* [1411] contains address 1 [1501] as the device ID address entry, L1 [1502] as the data length entry, and statistics [1503] such as the count of the data sent and received through the driver. The virtual driver [1430] that is used for communication in extended data length mode holds a link setup table-1*b* [1414]. FIG. 10(B) shows the structure of the link setup table-1*b* [1414]. The link setup table-1*b* [1414] contains address 1 [1601] as the device ID address entry, L2 [162] as the data length entry, and statistics [1603] such as the count of the data sent and received through the virtual driver.

FIG. 10(C) shows the structure of the routing table-1 [1413]. In the case of the network system model shown in FIG. 9, because the other end devices that the server [1401] is to communicate with are the client [1403] (address 3) and the backup server [1402] (address 2), the routing table-1 [1413] contains two sets of entries. Registered in the routing table-1 [1413], the entries [1705] for the client [1403] are address 3 [1701] as the destination address, address 3 [1702] as the NextHop address, send I/F with driver [1703] as the upward I/F with driver, and L1 [1704] as the data length. Similarly, the entries [1706] for the backup server are address 2 [1707] as the destination address, address 2 [1708] as the NextHop address, send I/F with virtual driver (1709) as the upward I/F with driver, and L2 [1710] as the data length. The reason why the destination address and NextHop address entries of both client and backup server are the same is that the server directly communicates with the client and backup server devices via the LAN [1404], or in other words, communication via a router is not performed (this will be the case with similar description hereinafter). This also accounts for that the destination address and NextHop address entries are the same in the routing table-2 [1420] on the backup server [1402] and the routing table-3 [1428] on the client [1403].

The multi-data-length receiving entity [1409] holds a multi-data-length management table [1415]. FIG. 10(D) shows the structure of the multi-data-length management table [1415]. In the case of the network system model shown in FIG. 9, because the other end devices that the server [1401] must communicate with after selecting appropriate data length are the client [1403] (address 3) and the backup server [1402] (address 2), the multi-data-length management table [1415] contains two sets of entries. Registered in the multi-data-length management table [1415], the entries [1801] for the client [1403] are address 3 [1802] as the sender address, L1 [1803] as the data length, and receive I/F with driver [1804] as the downward I/F with driver. Similarly, the entries [1805] for the backup server [1402] are address 2 [1806] as the sender address, L2 [1807] as the data length, and receive I/F with virtual driver [1808] as the downward I/F with driver.

The backup server [1402] is also composed of modules arranged in hierarchical structure, having AP [1416] on the top hierarchy and TCP/UDP [1417], IP [1418], a driver [1419], and a network interface card [1422] descending in the mentioned order. The driver [1419] that is used for communication in extended data length mode holds a link setup table-2 [1421]. Because the backup server [1402] shown in FIG. 9 performs communication only in extended data length mode, disabling communication in standard data length mode, it is provided with the single driver [1419] and the link setup table-2 [1421] that the driver holds. The driver 1419 is similar in function to the virtual driver 1430. In the example of Ethernet, the network interface card 1422 is a special card that transmits and receives extended length data frames. The special card 1422 also receives standard length data frames, but the driver 1419 will discard them on checking the destination address and/or the length. In another embodiment the Back-up server 1402 can be a mirror of server 1401 and accept both extended and standard length data.

FIG. 11(A) shows the structure of the link setup table-2 [1421]. The link setup table-2 [1421] contains address 2 [1901] as the device ID address entry, L2 [1902] as the data length entry, and statistics [1903] such as the count of the data sent and received through the driver. The IP [1418] holds a routing table-2 [1420] and is assigned address 2. In the case of the network system model shown in FIG. 9, because the other end device that the backup server [1402] is to communicate with is the server [1401] (address 1), the routing table-2 [1420] contains one set of entries. The routing table-2 [1420] contains address 1 [2001] as the destination address, address 1 [2002] as the NextHop address, send I/F with driver [2003] as the upward I/F with driver, and L2 [2004] as the data length.

The client [1403] is also composed of modules arranged in hierarchical structure, having AP [1423] on the top hierarchy and TCP/UDP [1424], IP [1425], driver [1426], and a network interface card [1427] descending in the mentioned order. The IP [1425] holds a routing table-3 [1428] and is assigned address 3. The driver [1426] that is used for communication in standard data length mode holds a link setup table-3 [1429]. In the example of Ethernet, the network interface card 1427 is a standard Ethernet II or IEEE 802.2/3 card that transmits and receives standard length data frames.

FIG. 11(C) shows the structure of the link setup table-3 [1429]. The link setup table-3 [1429] contains address 3 [2101] as the device ID address entry, L1 [2102] as the data length entry, and statistics [2103] such as the count of the data sent and received through the driver. FIG. 11(D) shows the structure of the routing table-3 [1428]. In the case of the network system model shown in FIG. 9, because the other end device that the client [1403] is to communicate with is the server [1401] (address 1), the routing table-3 [1428] contains one set of entries. The routing table-3 [1428] contains address 1 [2201] as the destination address, address 1 [2202] as the NextHop address, send I/F with driver [2203] as the upward I/F with driver, and L1 [2204] as the data length.

Then, the process of communication between the server [1401] and the client [1403] will be explained below, using FIGS. 12 and 13.

Figure 12:
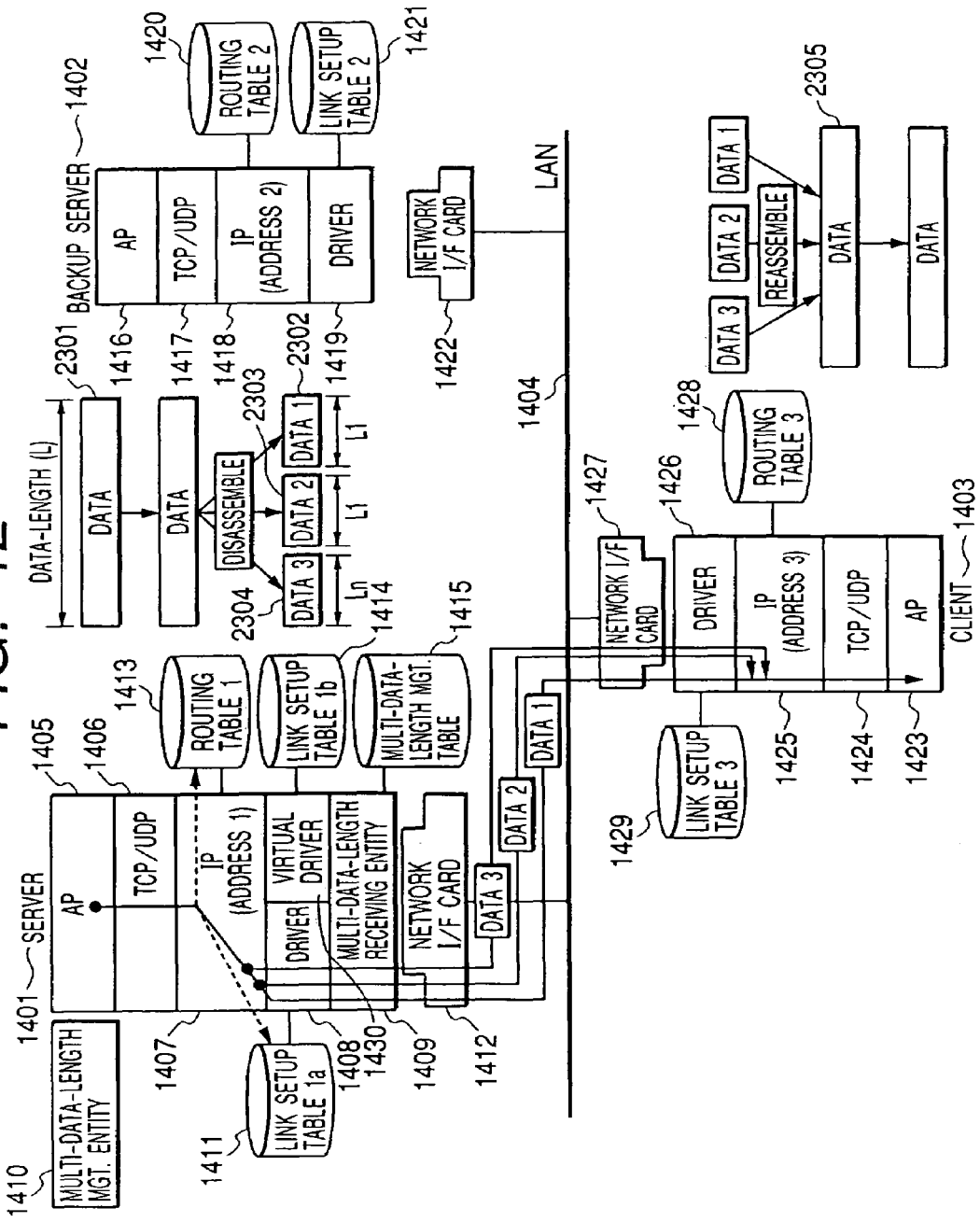
FIG. 12 is a schematic diagram illustrating the processing flow when the server sends data to the client in the system model shown in FIG. 9.

FIG. 12 is a schematic diagram illustrating the processing flow when the server sends data to the client in the system model shown in FIG. 9. That is, FIG. 12 depicts a case where the server [1401] sends data to the client [1403]. The AP [1405] of the server [1401] generates data [2301] of data length (L) and delivers this data with the destination address (address 3) information to the TCP/UDP [1406]. After receiving the data [2301] and carrying out processing for the data such as controlling the quantity of data to be transferred and assuring the reliability of data transfer, the TCP/UDP [1406] adds a TCP/UDP header to the data and delivers the data [2301] to the IP [1407]. The TCP/UDP header, however, is omitted in the description with FIGS. 12 and 13 and will be omitted correspondingly hereinafter. After receiving the data [2301] and carrying out the processing regarding data transmission for the data, the IP [1407] computes an optimum route for transferring the data [2301] to the destination (the next device to which the data is transmitted). This computation is searching the routing table-1 [1413] with the search key of destination address (address 3 in this example). As the result of the search, the IP obtains a NextHop address (address 3 [1702] in this example), an interface with a driver to which the data is to be delivered (send I/F with driver [1703] in this example), and data length (L1 [1704] in this example). Moreover, the IP [1407] reads the link setup table-1a [1411] held by the driver to which the data is to be delivered (driver [1408] in this example) and thereby obtains data length (L1 [1502] in this example).

Figure 2:
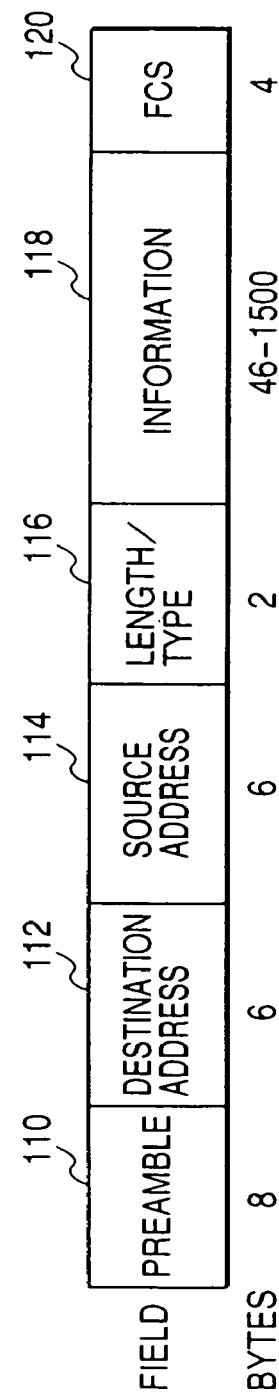
FIG. 2 shows a format for an Ethernet Frame.
Figure 3:
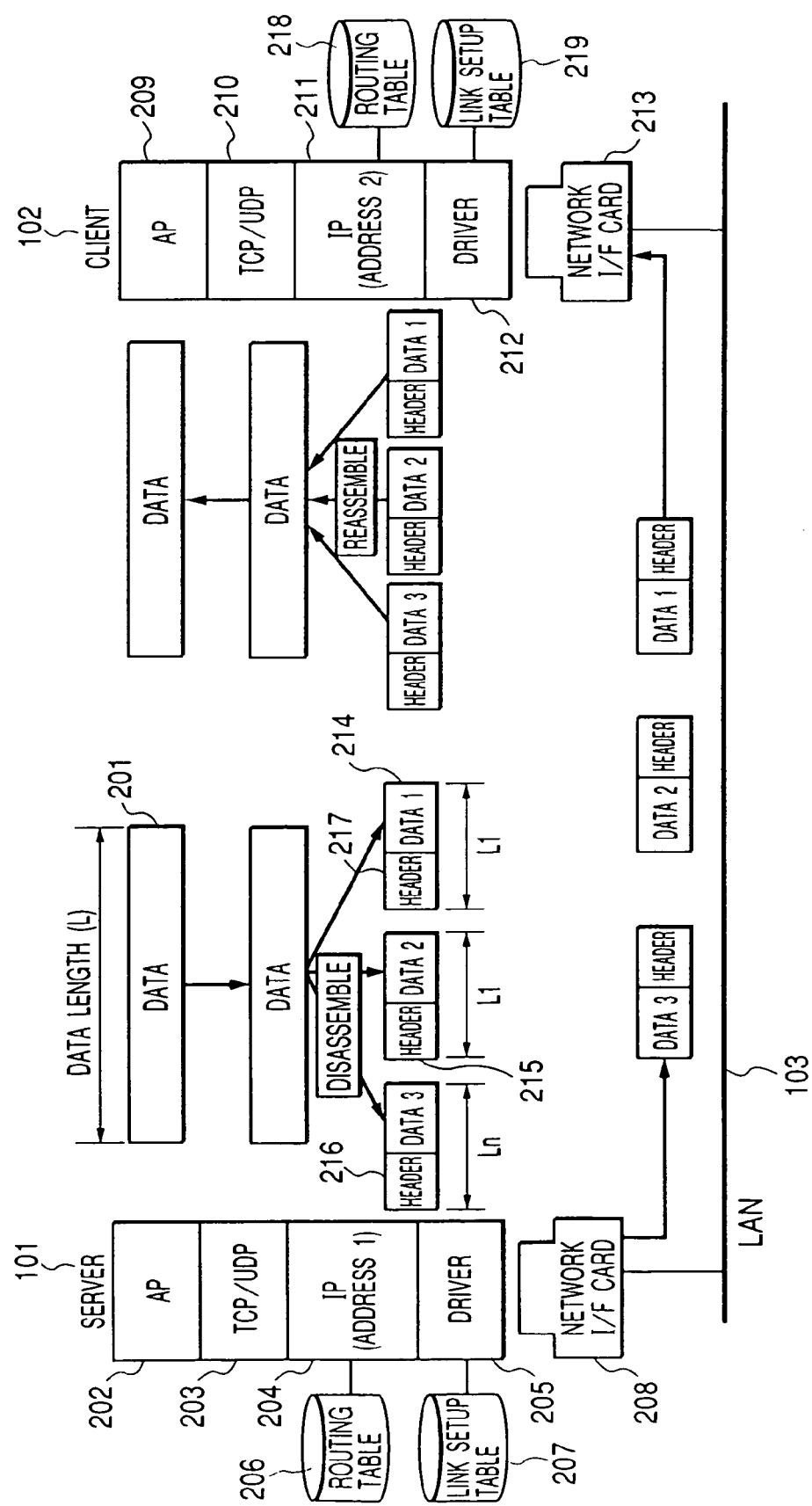
FIG. 3 is a schematic diagram showing the detailed structures of the server and the client and illustrating how the server and the client handle data (disassembling data into segments and reassembling the segments into data)
Figure 4A:
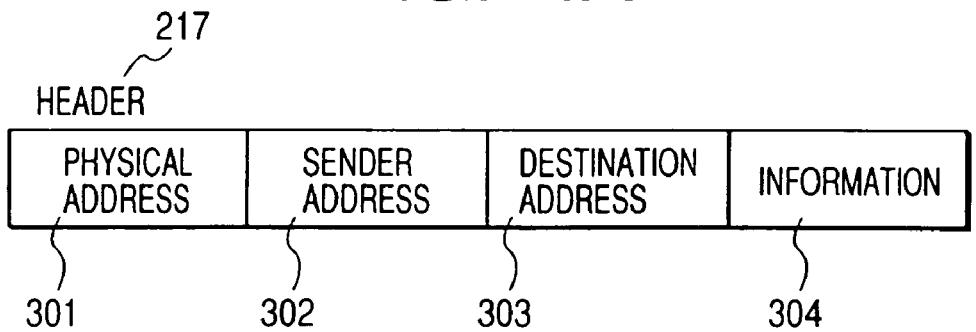
FIGS. 4A, 4B, and 4C show the structures of a header that the IP adds to a data frame, a routing table that the IP holds, and a link setup table that the driver holds.
Figure 4B:
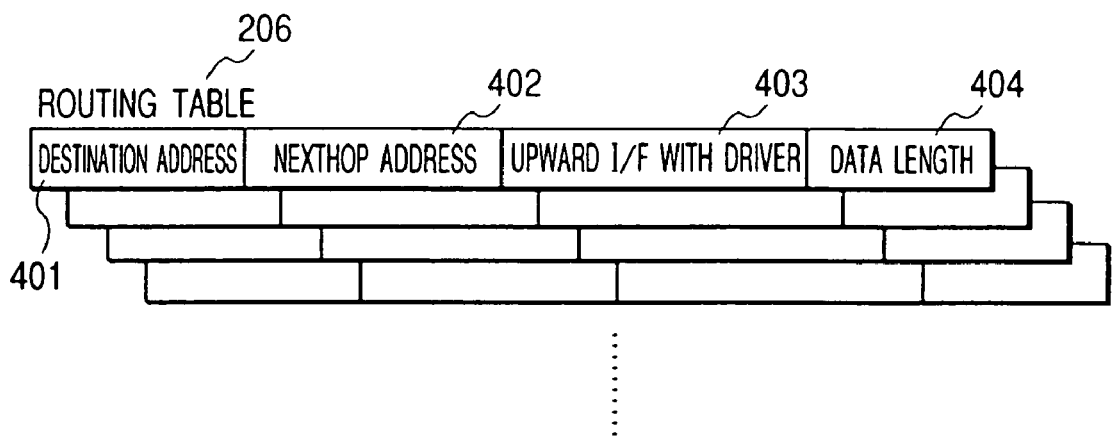
Figure 4C:
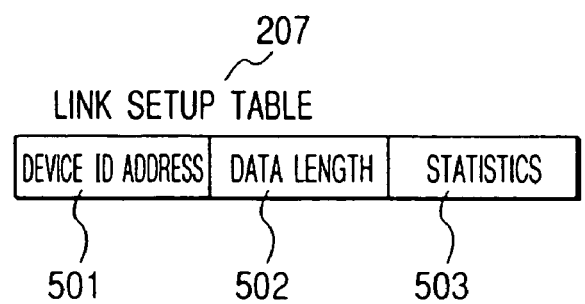

Because the data length (L1) obtained from the routing table-1 [1413] equals the data length (L1) obtained from the link setup table-1a [1411], the IP [1407] disassembles the data [2301] into segments of length L1. As a result, data 1 [2301], data 2 [2302], and data 3 [2304] are generated and delivered to the driver [1408]. Note that the data segments include a header, which was explained for FIG. 2 and FIG. 3(A), and their length L1 includes the header length. The last data segment (data 3 in this example) may be shorter than L1 (the length of the last data is Ln in this example), because it is the remainder after disassembling the data into equal lengths. The empty portion of the last data frame may be packed with some other suitable data so that the last data will meet the length of L1. When the driver [1408] to which the data has been delivered issues a send request to the network interface card [1412], the data is sent via the LAN [1404] to the client [1403]. Because the multi-data-length receiving entity [1409] is active during data reception only, it does not intervene in sending operation. The data 1 [2302], data 2 [2303], and data 3 [2304] arrived at the client [1403] via the LAN [1404] are delivered from the network interface card [1427] through the driver [1426] to the IP [1425]. The IP [1425] removes the header, which was explained for FIG. 2 and FIG. 3(A), from the data segments and reassembles these segments into whole data. The reassembled data [2301] is forwarded through the TCP/UDP [1424] to the AP [1423], when the data transfer from the server [1401] to the client [1403] is complete.

In FIG. 12, if the LAN 1404 is an Ethernet network, then Back-up server 1402 network I/F card 1422 will also receive data 1, data 2, and data 3. However, the driver 1419 will recognize the destination address if not that of Back-up server 1402 and/or that the length is a standard length and thus discard the received standard frames.

Figure 13:
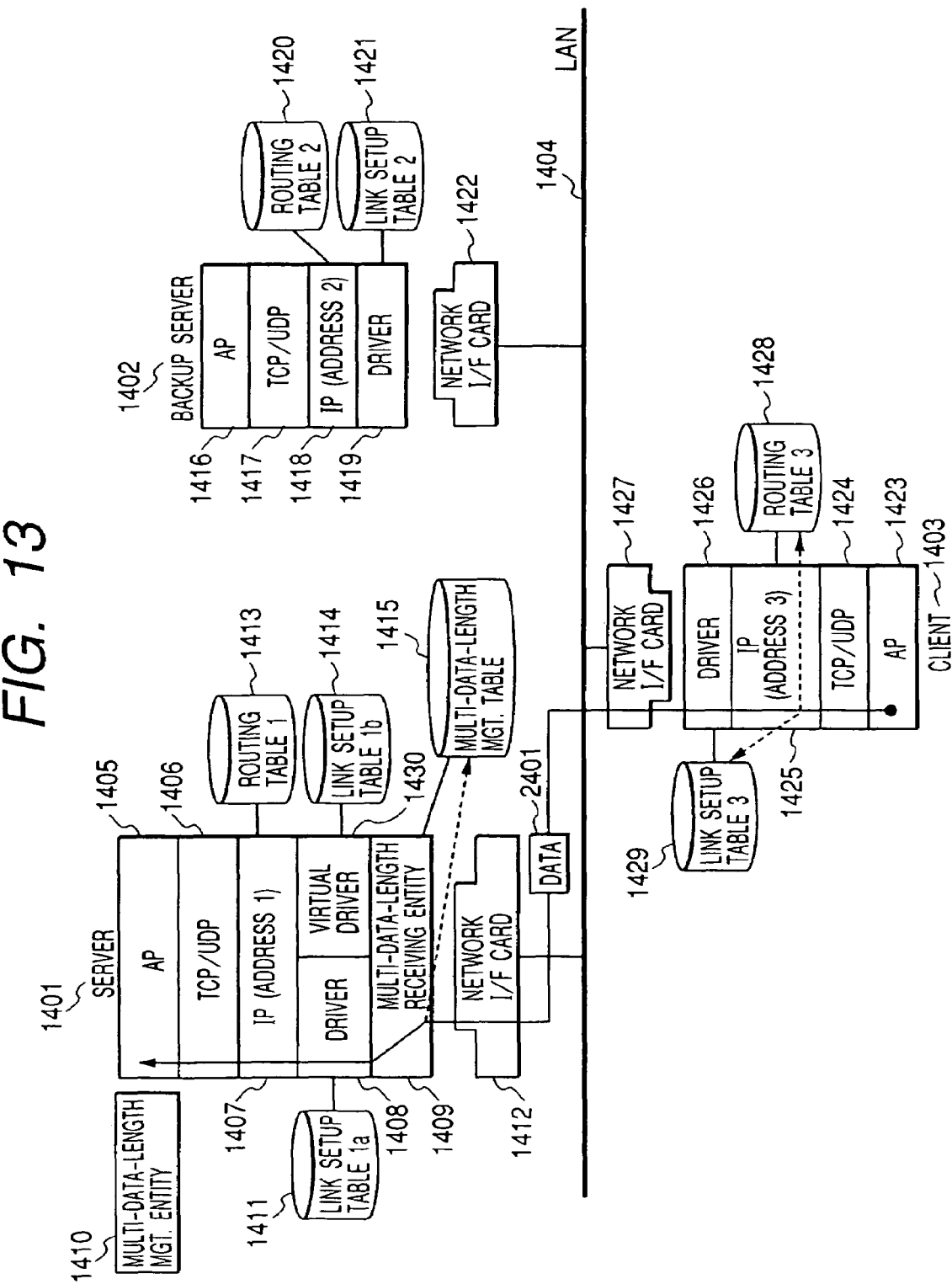
FIG. 13 is a schematic diagram illustrating the processing flow when the client sends data to the server in the system model shown in FIG. 9.

FIG. 13 is a schematic diagram illustrating the processing flow when the client sends data to the server in the system model shown in FIG. 9. That is, FIG. 13 depicts a case where the client [1403] sends data to the server [1401]. Data [2401] generated by the AP [1423] of the client [1403] is delivered through the TCP/UDP [1424], IP [1425], and driver [1426] to the network interface card [1427] from which the data is transmitted over the LAN [1404] to the server [1401]. During this process, the IP [1425] searches the routing table-3 [1428] and reads the link setup table-3 [1429] and thereby obtains an optimum route and data length (L1) in the same manner as explained for the corresponding processing on the server [1401] illustrated in FIG. 12. In this example, the length of the data [2401] generated by the AP [1423] of the client [1403] is assumed to be shorter than L1, and thus the data is not disassembled. If the data [2401] is longer than L1, the IP [1425] disassembles the data [2401] into segments of L1 in the same way as explained for FIG. 12. The data [2401] arrived at the server [1401] via the LAN [1404] is stored into the receive data buffer (the receive data buffer 1003 in FIG. 7 (B)) of the multi-data-length receiving entity [1409] after passing though the network interface card [1412]. The management table read section (the management table read section 1001 in FIG. 7(B)) of the multi-data-length receiving entity [1409] searches the multi-data-length management table [1415] with the search key of the sender address (address 3 in this example) from the received data [2401]. As a result, data length (L1 [1803] and receive I/F with driver [1804] are obtained. The multi-data-length receiving entity [1409] delivers the received data [2401] to the driver [1408] via the receive I/F with driver [1804]. The received data [2401] is forwarded from the driver [1408] though the IP [1407] and the TCP/UDP [1406] to the AP [1405], when the data transfer from the client [1403] to the server [1401] is complete. The above explanation for FIG. 13 discussed the case where the data [2401] is not disassembled because its length is shorter than the maximum frame data length (L1 in this example) set for the LAN [1404]. If, however, the arrived data has been disassembled, the IP [1407] executes data reassembly as explained for FIG. 12.

Next, the process of communication between the server [1401] and the backup server [1402] will be explained below, using FIGS. 14 and 15.

Figure 14:
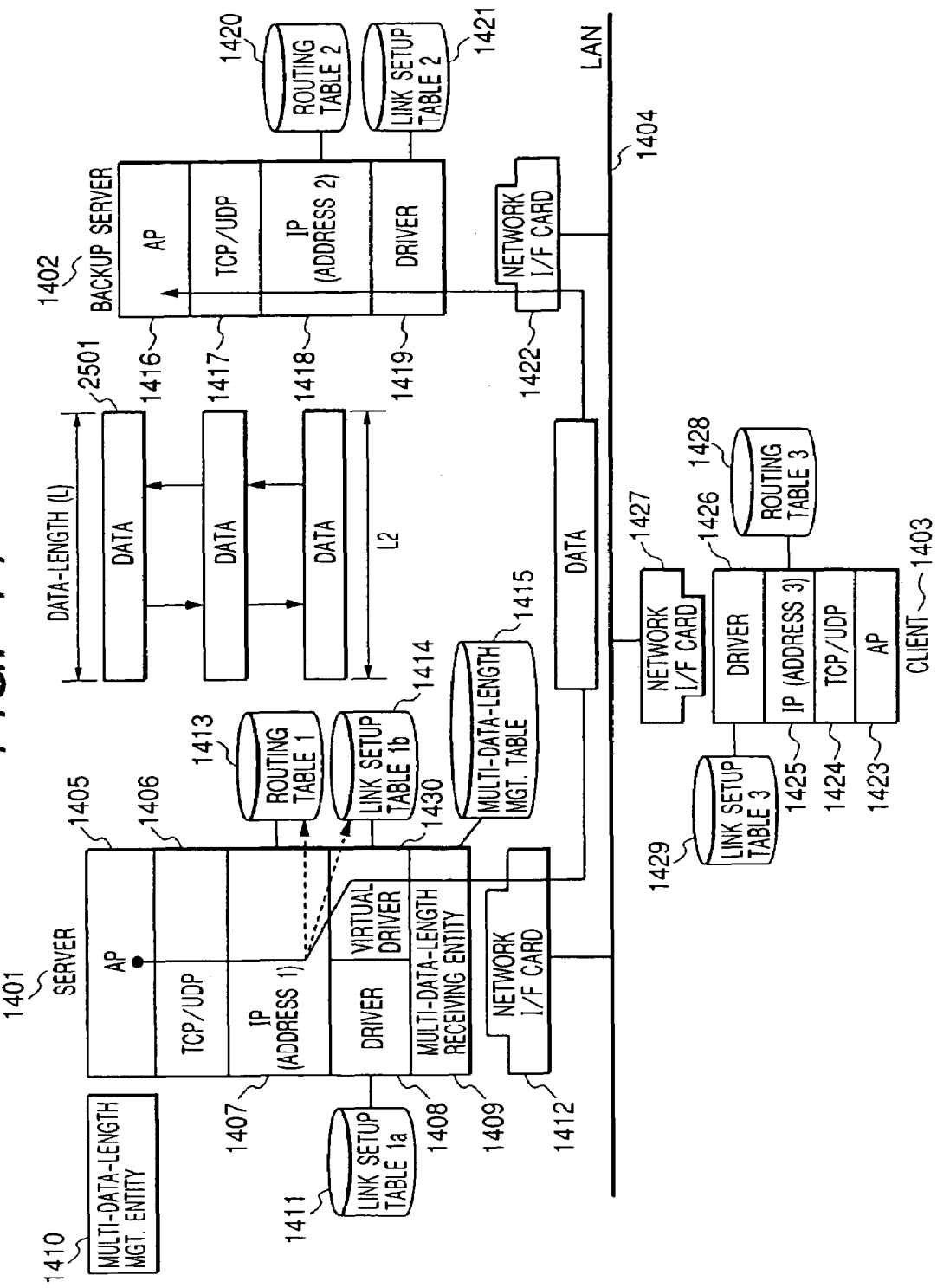
FIG. 14 is a schematic diagram illustrating the processing flow when the server sends data to the backup server in the system model shown in FIG. 9.

FIG. 14 is a schematic diagram illustrating the processing flow when the server sends data to the backup server in the system model shown in FIG. 9. That is, FIG. 14 depicts a case where the server [1401] sends data to the backup server [1402]. The AP [1405] of the server [1401] generates data [2501] of data length (L) and delivers this data with the destination address (address 2) information to the TCP/UDP [1406]. After receiving the data [2501] and carrying out processing for the data such as controlling the quantity of data to be transferred and assuring the reliability of data transfer, the TCP/UDP [1406] adds a TCP/UDP header to the data and delivers the data [2501] to the IP [1407]. After receiving the data [2501] and carrying out the processing regarding data transmission for the data, the IP [1407] computes an optimum route for transferring the data [2501] to the destination, that is, searches the routing table-1 [1413] with the search key of destination address (address 2 in this example). As the result of the search, the IP obtains a NextHop address (address 2 [1708] in this example), an interface with a driver to which the data is to be delivered (send I/F with virtual driver [1709] in this example), and data length (L2 [1710] in this example). Moreover, the IP [1407] reads the link setup table-1b [1414] held by the driver to which the data is to be delivered (virtual driver [1430] in this example) and thereby obtains data length (L2 [1602] in this example). Because the data length (L2 [1701]) obtained from the routing table-1 [1413] equals the data length (L2 [1602]) obtained from the link setup table-1b [1414], the IP [1407] disassembles the data [2501] into segments of length L2, if necessary. In this example of FIG. 14, however, the length (L) of the data [2501] generated by the AP [1405] is assumed to be shorter than the obtained data length (L2), and thus the IP [1407] does not disassemble the data [2501]. If the length (L) of the data [2501] is longer than L2, the IP [1407] disassembles the data into segments as explained for FIG. 12.

When the IP [1407] delivers the data [2501] to the virtual driver [1430], the virtual driver [1430] issues a request to send to the network interface card [1412]. As a result, the data [2501] is sent to the backup server [1402] via the LAN [1404]. Because the multi-data-length receiving entity [1409] is active during data reception only, it does not intervene in sending operation. The data [2501] arrived at the backup server [1402] via the LAN [1404] is forwarded from the network interface card [1422] through the driver [1419], IP [1418], and TCP/UDP [1417] to the AP [1416], when the data transfer from the server [1401] to the backup server [1402] is complete. The above explanation for FIG. 14 discussed the case where the data [2501] is not disassembled because its length is shorter than the maximum frame data length (L2 in this example) defined for the communication between the server [1401] and the backup server [1402]. If, however, the arrived data has been disassembled, the IP [1418] executes data reassembly as explained for FIG. 12.

If LAN 1404 where an Ethernet LAN, then client 1403 network I/F card 1427 would also receive the extended frame carrying the data 2501. The first about 1514 bytes entered into the network I/F card 1427 buffer are discarded as the destination address and length are wrong. The network I/F card 1427 would then receive the remaining bits in the extended frame, but ignore them, as the network I/F card 1427 is looking for the next frame. Thus the client 1403 essentially ignores the extended data frame.

Figure 15:
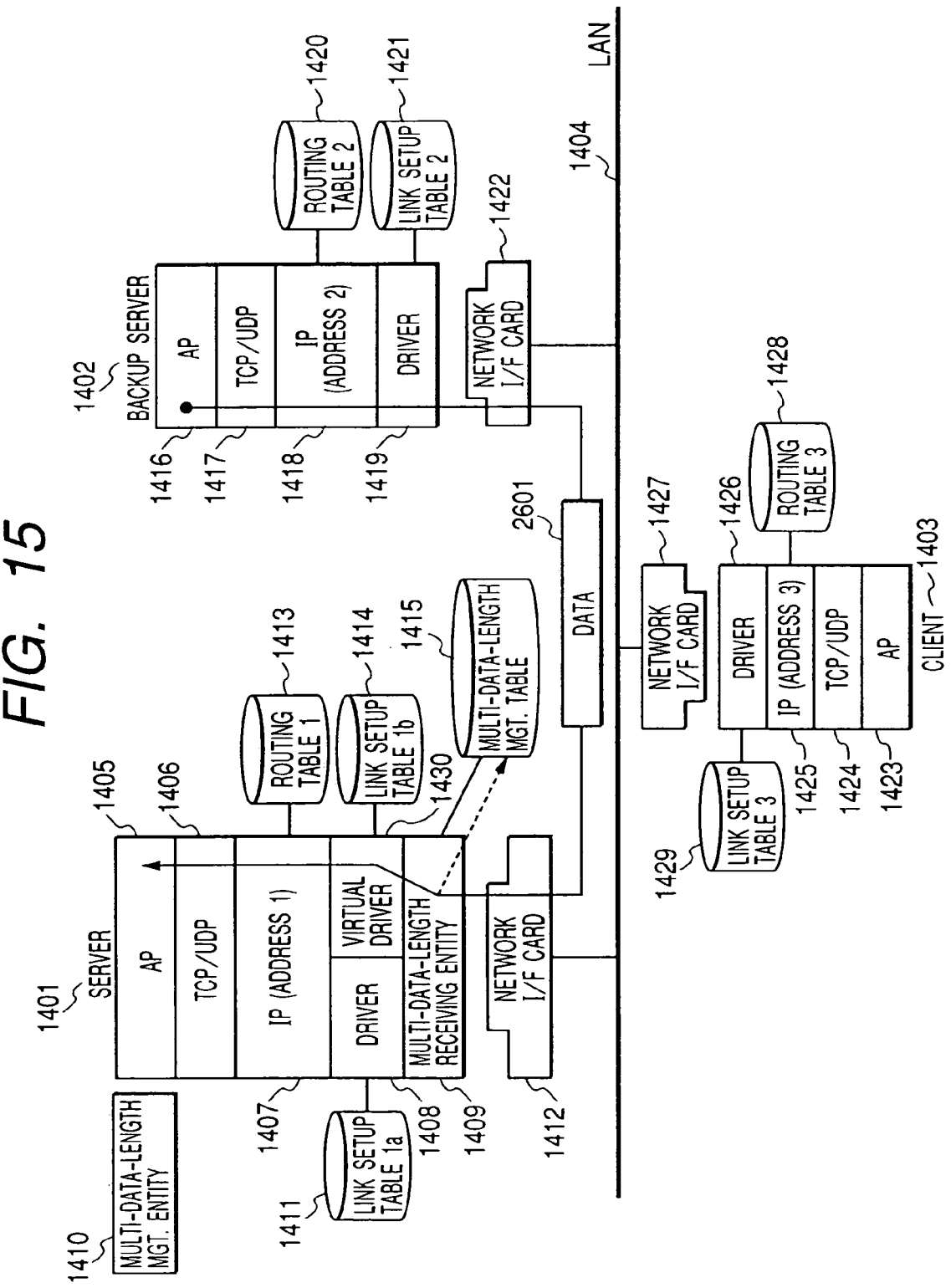
FIG. 15 is a schematic diagram illustrating the processing flow when the backup server sends data to the server in the system model shown in FIG. 9.

FIG. 15 is a schematic diagram illustrating the processing flow when the backup server sends data to the server in the system model shown in FIG. 9. That is, FIG. 15 depicts a case where the backup server [1402] sends data to the server [1401]. Data [2601] generated by the AP [1416] of the backup server [1402] is delivered through the TCP/UDP [1417], IP [1418], and driver [1419] to the network interface card [1422] from which the data is transmitted over the LAN [1404] to the server [1401]. During this process, the IP [1418] searches the routing table-2 [1420] and reads the link setup table-2 [1421] and thereby obtains an optimum route and data length (L2) in the same manner as explained for the corresponding processing on the server [1401] illustrated in FIG. 14. In this example, the length of the data [2601] generated by the AP [1416] of the backup server [1402] is assumed to be shorter than L2, and thus the data is not disassembled. If the data [2601] is longer than L2, the IP [1418] disassembles the data [2601] into segments of L2 in the same way as explained for FIG. 12. The data [2601] arrived at the server [1401] via the LAN [1404] is stored into the receive data buffer (1003 in FIG. 7 (B)) of the multi-data-length receiving entity [1409] after passing though the network interface card [1412]. The management table read section (1001 in FIG. 7(B)) of the multi-data-length receiving entity [1409] searches the multi-data-length management table [1415] with the search key of the sender address (address 2 in this example) from the received data [2601]. As a result, data length (L2 [1807] and receive I/F with virtual driver [1808] are obtained. The multi-data-length receiving entity [1409] delivers the received data [2601] to the virtual driver [1430] via the receive I/F with virtual driver [1808]. The received data [2601] is forwarded from the virtual driver [1430] though the IP [1407] and the TCP/UDP [1406] to the AP [1405], when the data transfer from the backup server [1402] to the server [1401] is complete. The above explanation for FIG. 15 discussed the case where the data [2601] is not disassembled. If, however, the arrived data has been disassembled, the IP [1407] executes data reassembly as explained for FIG. 12.

The above FIGS. 12 and 14 show that extended length data 2601 can be sent from the server 1401 to the back-up server 1402 on the same physical line as standard length data, e.g., L1, can be sent from the server 1401 to the client 1403. FIGS. 13 and 15 shows the similar thing with roles of sender and receiver reversed. One result of this embodiment is that server 1401 while sending mass back-up data to back-up server 1402 using extended length data frames can keep communicating with client 1403 using standard length data frames. Thus the server 1401 has two lines of communication open at the same time. There is no need for a LAN switch. Another result is that while the network I/F cards on server 1401 and back-up server 1402 need to be special cards, the client 1403 can use its existing network I/F card 1427. Thus there is backward compatibility with existing LAN systems.

Then, the following discusses an example case where a server copes with a plurality of extended data length settings, using FIGS. 16, 17, and 18. In this example, it is assumed that the server communicates with three other servers for which different data length settings for data transmission are defined.

FIG. 16 is a diagram showing an example system model of an embodiment of the present invention, having a server, three other servers, and a client. Using FIG. 16, the system structure will be described below. The server [2701], which may be, for example, a WWW server, a mail server, or a file server, will usually communicate with the client [2705] via a LAN [2706]. The client [2705] issues a request for service to the server [2701] via the LAN [2706] and receives the service. Server 1 [2702], server 2 [2703], and server 3 [2704] will exchange data with the server [2701] via the LAN [2706]. The standard data length defined for the LAN [2706] is assumed to be L1. In this example, the following are further assumed: the communication between the server [2701] and the client [2705] is performed in standard data length (L1) mode; the communication between the server [2701] and the server 1 [2702] is performed in a mode of extended data length 1 (set at L2); the communication between the server [2701] and the server 2 [2703] is performed in a mode of extended data length 2 (set at L3); and the communication between the server [2701] and the server 3 [2704] is performed in a mode of extended data length 3 (set at L4).

The structure of the server [2701] will be detailed below, using FIGS. 16, 17, and 18. The structure of each of the server 1 [2702], server 2 [2703], and server 3 [2704] and the structure of the client [2705] are the same as those shown in FIG. 9, whereas the address assignments to theses entities and the definitions of data length to enable the entities to communicate with the server are different from FIG. 9. The server 1 [2702] is assigned address 2 and a data length setting of L2 applies to it. The server 2 [2703] is assigned address 3 and a data length setting of L3 applies to it. The server 3 [2704] is assigned address 4 and a data length setting of L4 applies to it. The client [2705] is assigned address 5 and a data length setting of L1 applies to it.

As shown in FIG. 16, the server [2701] is composed of modules arranged in hierarchical structure, having AP [2707] on the top hierarchy and a multi-data-length management entity [2716], TCP/UDP [2708], IP [2709], a driver [2710], a virtual driver 1 [2711], a virtual driver 2 [2712], a virtual driver 3 [2713] a multi-data-length receiving entity [2714], and a network interface card [2715] descending in the mentioned order (for the details of the modules, refer to the description of the overall structure diagram using FIG. 6).

Figure 17A:
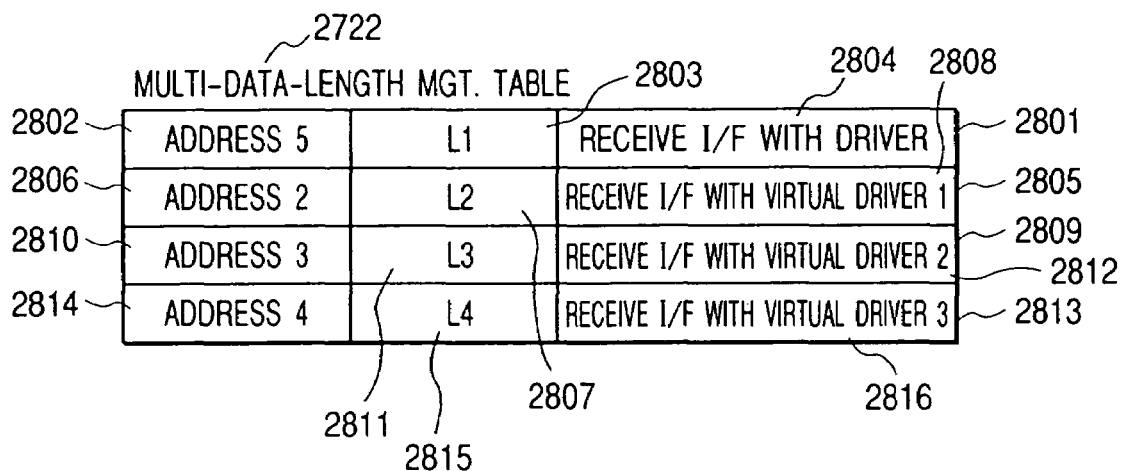
FIGS. 17A, 17B, and 17C show the structures of the multi-data-length management table, link setup table-1a, and link setup table-1b that are used in the system model shown in FIG. 16.

The multi-data-length receiving entity [2714] holds a multi-data-length management table [2722]. FIG. 17(A) shows the structure of the multi-data-length management table [2722]. In the case of the network system model shown in FIG. 16, because the other end devices that the server [2701] must communicate with after selecting appropriate data length are the client [2705] (address 5), server 1 [2702] (address 2), server 2 [2703] (address 3), and server 3 [2704] (address 4), the multi-data-length management table [2722] contains four sets of entries. The following are registered in the multi-data-length management table [2722]: the entries [2801] for the client [2705] that are address 5 [2802] as-the sender address, L1 [2803] as the data length, and receive I/F with driver [2804] as the downward I/F with driver; the entries [2805] for the server 1 [2702] that are address 2 [2806] as the sender address, L2 [2807] as the data length, and receive I/F with virtual driver 1 [2808] as the downward I/F with driver; the entries [2809] for the server 2 [2703] that are address 3 [2810] as the sender address, L3 [2811] as the data length, and receive I/F with virtual driver 2 [2812] as the downward I/F with driver; and the entries [2813] for the server 3 [2704] that are address 4 [2814] as the sender address, L4 [2815] as the data length, and receive I/F with virtual driver 3 [2816] as the downward I/F with driver.

Figure 17B:
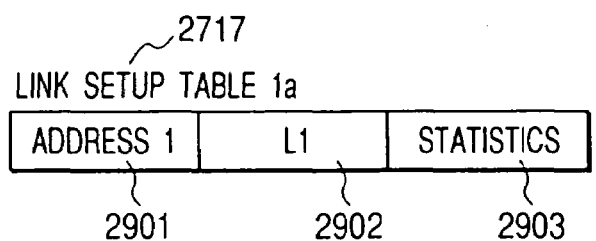
Figure 17C:
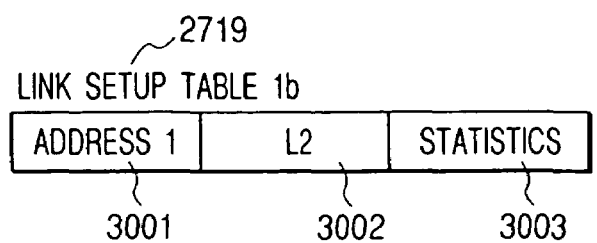

The driver [2710] that is used for communication in standard data length mode holds a link setup table-1a [2717]. FIG. 17(B) shows the structure of the link setup table-1a [2717]. The link setup table-1a [2717] contains address 1 [2901] as the device ID address entry, L1 [2902] as the data length entry, and statistics [2903] such as the count of the data sent and received through the driver. The virtual driver 1 [2711] that is used for communication in extended data length mode holds a link setup table-1b [2719]. FIG. 17(C) shows the structure of the link setup table-1b [2719]. The link setup table-1b [2719] contains address 1 [3001] as the device ID address entry, L2 [3002] as the data length entry, and statistics [3003] such as the count of the data sent and received through the virtual driver 1. Similarly, the virtual driver 2 [2712] holds a link setup table-1c [2720]. FIG. 18(A) shows the structure of the link setup table-1c [2720]. The link setup table-1c [2720] contains address 1 [3101] as the device ID address entry, L3 [3102] as the data length entry, and statistics [3103] such as the count of the data sent and received through the virtual driver 2. Similarly, the virtual driver 3 [2713] holds a link setup table-1 d [2721]. FIG. 18(B) shows the structure of the link setup table-1d [2721]. The link setup table-1d [2721] contains address 1 [3201] as the device ID address entry, L4 [3202] as the data length entry, and statistics [3203] such as the count of the data sent and received through the virtual driver 3.

The IP [2709] holds a routing table-1 [2718] and is assigned address 1. FIG. 18(C) shows the structure of the routing table-1 [2718]. In the case of the network system model shown in FIG. 16, because the other end devices that the server [2701] is to communicate with are the client [2705] (address 5), server 1 [2702] (address 2), server 2 [2703] (address 3), and server 3 [2704] (address 4), the routing table-1 [2718] contains four sets of entries. The following are registered in the routing table-1 [2718]: the entries [3301] for the client [2705] that are address 5 [3302] as the destination address, address 5 [3303] as the NextHop address, send I/F with driver [3304] as the upward I/F with driver, and L1 [3305] as the data length; the entries [3306] for the server 1 [2702] that are address 2 [3307] as the destination address, address 2 [3308] as the NextHop address, send I/F with virtual driver 1 [3309] as the upward I/F with driver, and L2 [3310] as the data length; the entries [3311] for the server 2 [2703] that are address 3 [3312] as the destination address, address 3 [3313] as the NextHop address, send I/F with virtual driver 2 [3314] as the upward I/F with driver, and L3 [3315] as the data length; and the entries [3316] for the server 3 [2704] that are address 4 [3317] as the destination address, address 4 [3318] as the NextHop address, send I/F with virtual driver 3 [3319] as the upward I/F with driver, and L4 [3320] as the data length.

In the method explained for FIG. 8, the multi-data-length management entity [2716] executes: creating virtual driver 1 [2711], virtual driver 2 [2712], virtual driver 3 [2713]; writing settings into the routing table-1 [2718]; creating link setup table-1 a [2717], link setup table-1b [2719], link setup table-1c [2720], link table-1d [2721], and multi-data-length management table [2722] and writing settings into these tables.

On the server [2701] configured as shown in FIGS. 16, 17, and 18, the IP [2709] searches the routing table-1 [2718] and reads any of the link setup tables, depending on the other end device that the server is making the connection with, and the multi-data-length receiving entity [2717] searches the multi-data-length management table [2722] as explained for FIGS. 12, 13, 14, and 15. In this way, communication in appropriate data length mode can be carried out. Although the above explanation discussed the case where three other servers and three extended data length settings are used, the same can apply to operation with two servers or four or more servers.

Then, the following discusses an example of the operation of a network system model, to which the present invention is applied, wherein send data length is dynamically changed during the operation, using FIGS. 19, 20, 21, 22, 23, 10, 11, and 7.

Figure 19:
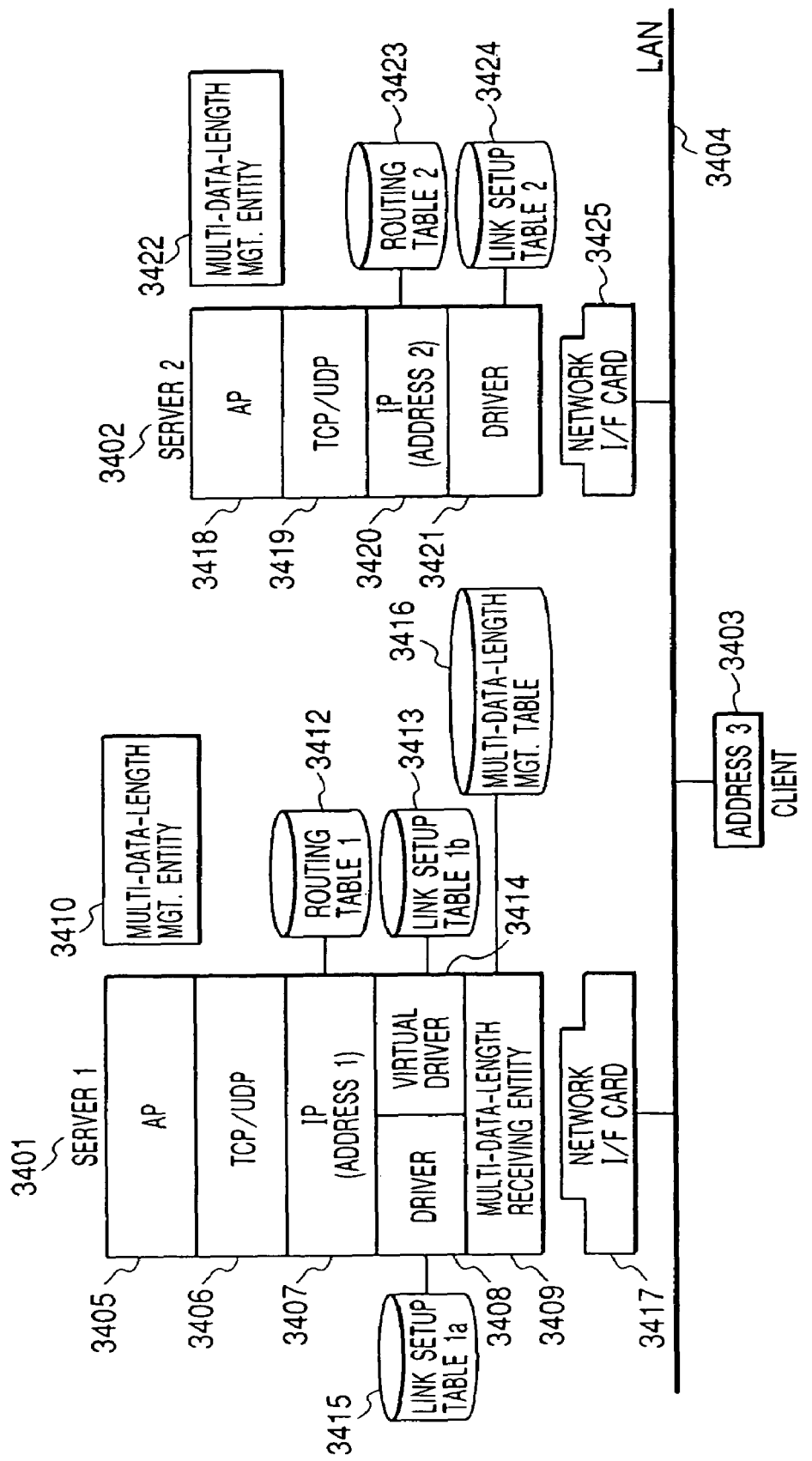
FIG. 19 is a diagram showing the structures of a server and another server to enable dynamic data length change of an embodiment of the present invention.

FIG. 19 is a diagram showing the structures of a server 1 and server 2 to enable dynamic data length change. Using FIG. 19, the system structure will be explained below. The server 1 [3401], which may be, for example, a WWW server, a mail server, or a file server, will usually communicate with a client [3403] via a LAN [3404]. The client [3403] issues a request for service to the server [3401] via the LAN [3404] and receives the service. The server 2[3402] may exchange large data segments with server 1 [3401] via the LAN [3404]. These devices are interconnected via the LAN [3404] and the standard data length defined for the LAN [3404] is assumed to be L1 in this example. It is also assumed that the communication between the server [3401] and the client [3403] is performed in standard data length (L1) mode and the communication between the server 1 [3401] and the server 2 [3402] is performed in extended data length (set at L2) mode.

Using FIGS. 19, 10, and 11, the structures of the devices will be described below. However, the structure of the client [3403] is the same as that described with FIGS. 9 and 11 and therefore its explanation will not be repeated. As shown in FIG. 19, the server 1 [3401] is composed of modules arranged in hierarchical structure, having AP [3405] on the top hierarchy and a multi-data-length management entity [3410], TCP/UDP [3406], IP [3407], a driver [3408], a virtual driver [3414], a multi-data-length receiving entity [3409], and a network interface card [3417] descending in the mentioned order (for the details of the modules, refer to the description of the overall structure diagram using FIG. 6).

The IP [3407] holds a routing table-1 [3412] and is assigned address 1. The structure of the routing table-1 [3412] is shown in FIG. 10(C). In the case of the network system model shown in FIG. 19, because the other end devices that the server [3401] is to communicate with are the client [3403] (address 3) and the server 2 [3402] (address 2), the routing table-1 [3412] contains two sets of entries. The following are registered in the routing table-1 [3412]: the entries [1705] for the client [3403] that are address 3 [1701] as the destination address, address 3 [1702] as the NextHop address, send I/F with driver [1703] as the upward I/F with driver, and L1 [1704] as the data length; and the entries [1706] for the server 2[3402] that are address 2 [1707] as the destination address, address 2 [1708] as the NextHop address, send I/F with virtual driver 1 [1709] as the upward 1/F with driver, and L2 [1710] as the data length. The driver [3408] that is used for communication in standard data length mode holds a link setup table-1a [3415]. The structure of the link setup table-1a [3415] is shown in FIG. 10(A). The link setup table-1a [3415] contains address 1 [1501] as the device ID address entry, L1 [1502] as the data length entry, and statistics [1503] such as the count of the data sent and received through the driver. The virtual driver [3414] that is used for communication in extended data length mode holds a link setup table-1b [3413].

The structure of the link setup table-1b [3413] is shown in FIG. 10(B). The link setup table-1b [3413] contains address 1 [1601] as the device ID address entry, L2 [1602] as the data length entry, and statistics [1603] such as the count of the data sent and received through the virtual driver. The multi-data-length receiving entity [3409] holds a multi-data-length management table [3416]. The structure of the multi-data-length management table [3416] is shown in FIG. 10(D). In the case of the network system model shown in FIG. 19, because the other end devices that the server [3401] must communicate with after selecting appropriate data length are the client [3403] (address 3) and the server 2 [3402] (address 2), the multi-data-length management table [3416] contains two sets of entries. The following are registered in the multi-data-length management table [3416]: the entries [1801] for the client [3403] that are address 3 [1802] as the sender address, L1 [1803] as the data length, and receive I/F with driver [1804] as the downward I/F with driver; and the entries [1805] for the server 2 [3402] that are address 2 [1806] as the sender address, L2 [1807] as the data length, and receive I/F with virtual driver [1808] as the downward I/F with driver.

Similarly, the server 2 [3402] is composed of modules arranged in hierarchical structure, having AP [3418] on the top hierarchy and a multi-data-length management entity [3422], TCP/UDP [3419], IP [3420], a driver [3421], and a network interface card [3425] descending in the mentioned order (for the details of the modules, refer to the description of the overall structure diagram using FIG. 6). The IP [3420] holds a routing table-2 [3423] and is assigned address 2. The structure of the routing table-2 [3423] is shown in FIG. 11(B). In the case of the network system model shown in FIG. 19, because the other end device that the server 2 [3402] is to communicate with is the server [3401] (address 1), the routing table-2 [3423] contains one set of entries. The routing table-2 [3423] contains address 1 [2001] as the destination address, address 1 [2002] as the NextHop address, send I/F with driver [2003] as the upward I/F with driver, and L2 [2004] as the data length. The driver [3421] that is used for communication in extended data length (L2) mode holds a link setup table-2 [3424]. The structure of the link setup table-2 [3424] is shown in FIG. 11(A). The link setup table-2 [3424] contains address 2 [1901] as the device ID address entry, L2 [1902] as the data length entry, and statistics [1903] such as the count of the data sent and received though the driver.

Next, the process of changing data length will be explained, using FIGS. 20, 21, 22, 23, and 7.

Figure 20:
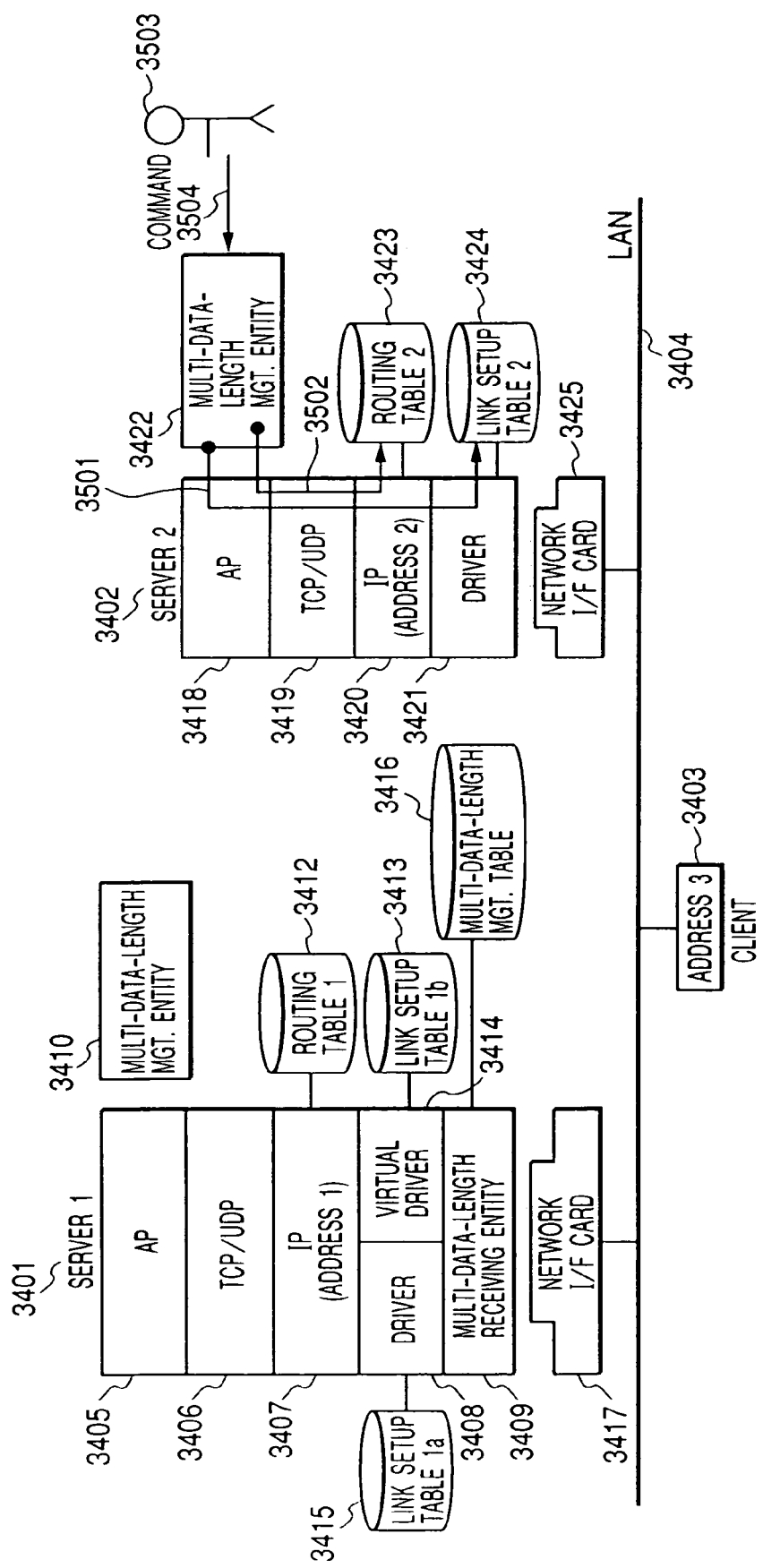
FIG. 20 is a diagram that illustrates changing the existing data length setting on the other server in the system model shown in FIG. 19.

FIG. 20 is a diagram that illustrates changing the existing data length setting on the server 2 in the system model shown in FIG. 19. That is, FIG. 20 depicts the process of changing the data length setting (from L2 to L3 in this example) on the server 2 [3402]. First, a network administrator [3503] issues a command [3504] for the multi-data-length management entity [3422] to write another setting into the link setup table-2 [3424]. When the set/entry section [901] of the multi-data-length management entity [3422] accepts the command [3504], the set/write section [902] of the multi-data-length management entity [3422] writes [3501] the setting (extended data length (L3)) into the link setup table-2 [3424] via the link setup table write AP tool. As a result, the data length entry in the link setup table-2 [3424] changes from L2 to L3 [3602] as shown in FIG. 21(A). Then, the network administrator [3503] issues a command [3504] for the multi-data-length management entity [3422] to write the setting into the routing table-2 [3423]. When the set/entry section [901] of the multi-data-length management entity [3422] accepts the command [3504], the set/write section [902] of the multi-data-length management entity [3422] writes [3502] the setting (extended data length (L3)) into the routing table-2 [3423] via the routing table write AP tool. As a result, the data length entry in the routing table-2 [3423] changes from L2 to L3 [3704] as shown in FIG. 21(B).

FIG. 22 is a diagram that illustrates changing the existing data length setting on the server 1 in the system model shown in FIG. 19. That is, FIG. 22 depicts the process of changing the data length setting on the server [3401] in response to a request for data length change (from L2 to L3 in this example) sent from the server 2 [3402] to the server 1 [3401]. First, the data length change request sending section [905] included in the multi-data-length management entity [3422] of the server 2 [3402] generates a data length change request packet [3805].

FIG. 35(A) shows the structure of the data length change request packet that is used to change the existing data length setting. As shown in FIG. 35(A), the data length change request packet [3805] contains address 2 [6101] as the request issuer address and L3 [6102] as data length to override the existing data length. After being generated, the data length change request packet [3805] is delivered through the TCP/UDP [3419] and IP [3420] to the driver [3421] and sent through the network interface card [3425] over the LAN [3404] to the destination. On receiving the data length change request packet [3805], the network interface card [3417] of the server 1 [3401] stores the packet [3805] into the receive data buffer (the receive data buffer 1003 in FIG. 7(B)) of the multi-data-length receiving entity [3409]. The management table read section (the management table read section 1001 in FIG. 7(B)) of the multi-data-length receiving entity [3409] searches the multi-data-length management table [3416] with the search key of the sender address (address 2 in this example) from the packet [3805]. As a result, data length (L2 [1807]) and receive I/F with virtual driver [1808] are obtained. The multi-data-length receiving entity [3409] delivers the packet [3805] to the virtual driver [3414] via the receive I/F with virtual driver [1808]. The packet [3805] is forwarded from the virtual driver [3414] though the IP [3407] and TCP/UDP [3406] to the multi-data-length management entity [3410].

When receiving the data length change request packet [3805], the data length change request receiving section [903] included in the multi-data-length management entity [3410] looks up the request issuer address (address 2 in this example) [6101] and data length to override the existing (L3 in this example) [6102] in the packet [3805]. Because the server 1 [3401] is equipped with the virtual driver [3414] that is for extended data length (L2) for address 2, changing the existing setting is carried out. The set/write section [902] writes [3804] the setting (extended data length (L3)) into the link setup table-1b [3413] via the link setup table write AP tool [3803] and into the routing table-1 [3412] via the routing table write AP tool. Lastly, the setting (extended data length (L3)) is written into the multi-data-length management table [3416], then the data length change process is complete. As a result, the data length entry in the link setup table-1b [3413] changes from L2 to L3 [3902] as shown in FIG. 23(A), the data length entry of the entries [4006] for the server 2 [3402] in the routing table-1 [3412] changes from L2 to L3 [4010] as shown in FIG. 23(B); and the data length entry of the entries [4105] for the server 2 [3402] in the multi-data-length management table [3416] changes from L2 to L3 [4107] as shown in FIG. 23(C).

By thus changing the data length settings in the tables, the length of the data to be transferred between server 1 [3401] and server 2 [3402] is extended from L2 to L3 after the processing of the change.

Next, the following discusses an example of the operation of a network system model, to which the present invention is applied, wherein different send data length is dynamically added during the operation, using FIGS. 24, 25, 26, 27, 28, 29, 10, 11, and 7.

FIG. 24 is a diagram showing the structures of a server and a backup server configured to enable data length addition. Using FIG. 24, the system structure will be explained below. The server [4201], which may be, for example, a WWW server, a mail server, or a file server, will usually communicate with a client [4203] via a LAN [4204]. The client [4203] issues a request for service to the server [4201] via the LAN [4204] and receives the service. The backup server [4202] periodically backs up the data on the server [4201] via the LAN [4204]. These devices are interconnected via the LAN [4204] and the standard data length defined for the LAN [4204] is assumed to be L1 in this example. It is also assumed that both the communication between the server [4201] and the client [4203] and the communication between the server [4201] and the backup server [4202] are performed in standard data length (L1) mode.

Using FIGS. 24, 25, 10, and 11, the structures of the devices will be described below. However, the structure of the client [4203] is the same as that described with FIGS. 9 and 11 and therefore its explanation will not be repeated.

As shown in FIG. 24, the server [4201] is composed of modules arranged in hierarchical structure, having AP [4205] on the top hierarchy and a multi-data-length management entity [4210], TCP/UDP [4206], IP [4207], a driver [4208], a multi-data-length receiving entity [4209], and a network interface card [4218] descending in the mentioned order (for the details of the modules, refer to the description of the overall structure diagram using FIG. 6).

The IP [4207] holds a routing table-1 [4211] and is assigned address 1. The structure of the routing table-1 [4211] is shown in FIG. 25(B). In the case of the network system model shown in FIG. 24, because the other end devices that the server [4201] is to communicate with are the client [4203] (address 3) and the backup server [4202] (address 2), the routing table-1 [4211] contains two sets of entries. The following are registered in the routing table-1 [4211]: the entries [4406] for the client [4203] that are address 3 [4407] as the destination address, address 3 [4408] as the NextHop address, send I/F with driver [4409] as the upward I/F with driver, and L1 [4410] as the data length; and the entries [4401] for the backup server [4202] that are address 2 [4402] as the destination address, address 2 [4403] as the NextHop address, send I/F with driver 1 [4404] as the upward I/F with driver, and L1 [4405] as the data length. The driver [4208] that is used for communication in standard data length mode holds a link setup table-1a [4212]. The structure of the link setup table-1a [4212] is shown in FIG. 250(A). The link setup table-1a [4212] contains address 1 [4301] as the device ID address entry, L1 [4302] as the data length entry, and statistics [4303] such as the count of the data sent and received through the driver.

The multi-data-length receiving entity [4209] holds a multi-data-length management table [4213]. The structure of the multi-data-length management table [4213] is shown in FIG. 25(C). In the case of the network system model shown in FIG. 24, because the other end devices that the server [4201] must communicate with after selecting appropriate data length are the client [4203] (address 3) and the backup server [4202] (address 2), the multi-data-length management table [4213] contains two sets of entries. The following are registered in the multi-data-length management table [4213]: the entries [4505] for the client [4203] that are address 3 [4506] as the sender address, L1 [4507] as the data length, and receive I/F with driver [4508] as the downward I/F with driver; and the entries [4501] for the backup server [4202] that are address 2 [4502] as the sender address, L1 [4503] as the data length, and receive I/F with driver [4504] as the downward I/F with driver.

Similarly, the backup server [4202] is composed of modules arranged in hierarchical structure, having AP [4214] on the top hierarchy and a multi-data-length management entity [4219], TCP/UDP [4215], IP [4216], a driver [4217], and a network interface card [4222] descending in the mentioned order (for the details of the modules, refer to the description of the overall structure diagram using FIG. 6). The IP [4216] holds a routing table-2 [4220] and is assigned address 2. The structure of the routing table-2 [4220] is shown in FIG. 25(E). In the case of the network system model shown in FIG. 24, because the other end device that the backup server [4202] is to communicate with is the server [4201] (address 1), the routing table-2 [4220] contains one set of entries. The routing table-2 [4220] contains address 1 [4701] as the destination address, address 1 [4702] as the NextHop address, send I/F with driver [4703] as the upward I/F with driver, and L1 [4704] as the data length. The driver [4217] that is used for communication in normal data length (L1) mode holds a link setup table-2 [4221]. The structure of the link setup table-2 [4221] is shown in FIG. 25(D). The link setup table-2 [4221] contains address 2 [4601] as the device ID address entry, L1 [4602] as the data length entry, and statistics [4603] such as the count of the data sent and received though the driver.

Next, the process of adding another data length setting (changing the existing data length setting on the backup server [4202], which will be the case with similar description hereinafter) will be explained below, using FIGS. 26, 27, 28, 29, and 7.

Figure 26:
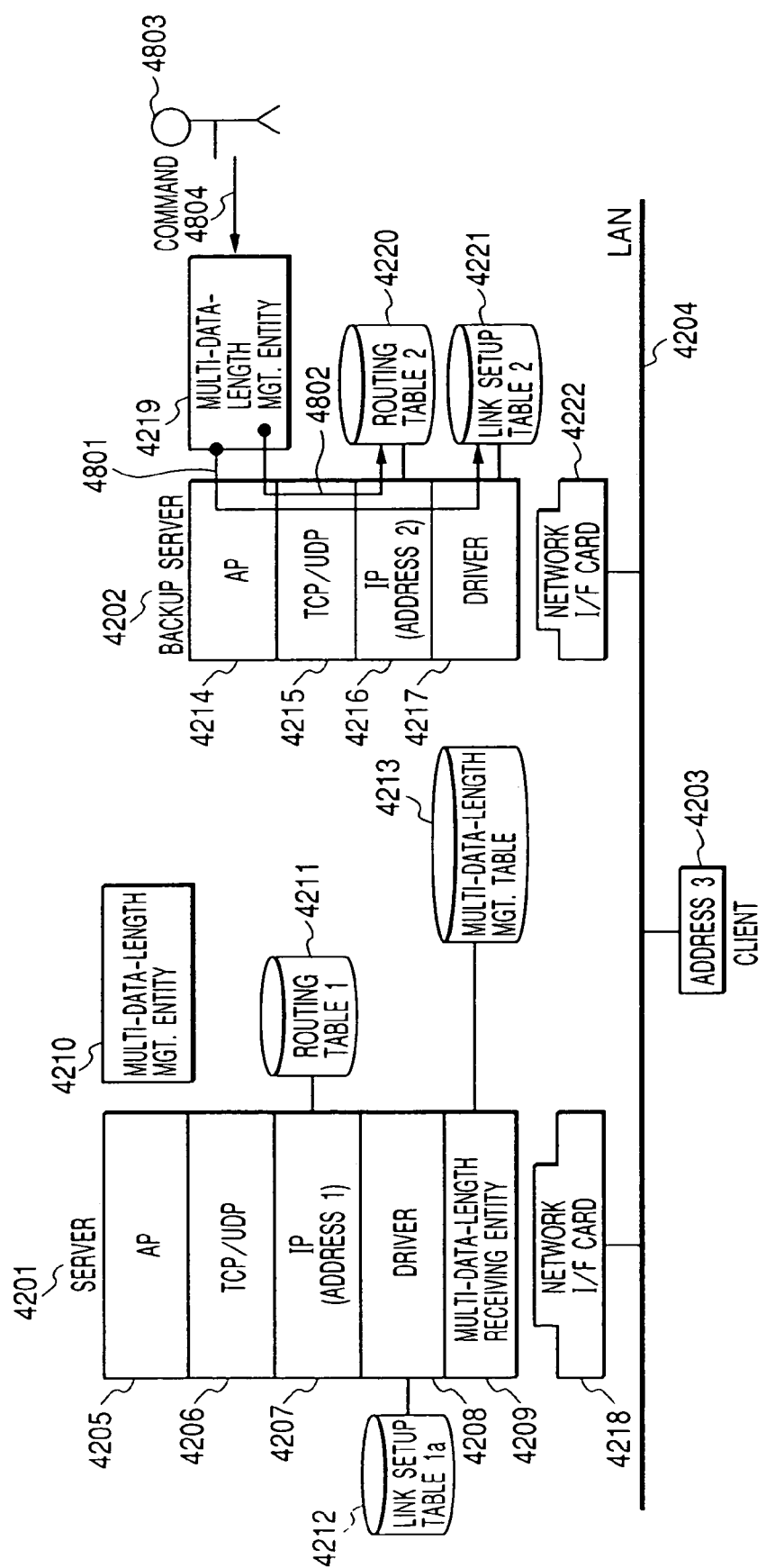
FIG. 26 is a diagram that illustrates changing the existing data length information on the other server in the system model shown in FIG. 24.

FIG. 26 is a diagram that illustrates changing the existing data length information on the backup server in the system model shown in FIG. 24. That is, FIG. 26 depicts the process of changing the data length setting (from L1 to L4 in this example) on the backup server [4202]. First, a network administrator [4803] issues a command [4804] for the multi-data-length management entity [4219] to write another setting into the link setup table-2 [4221]. When the set/entry section [901] of the multi-data-length management entity [4219] accepts the command [4804], the set/write section [902] of the multi-data-length management entity [4219] writes [4801] the setting (extended data length (L4)) into the link setup table-2 [4221] via the link setup table write AP tool. As a result, the data length entry in the link setup table-2 [4221] changes from L1 to L4 [4902] as shown in FIG. 27(A). Then, the network administrator [4803] issues a command [4804] for the multi-data-length management entity [4219] to write the setting into the routing table-2 [4220]. When the set/entry section [901] of the multi-data-length management entity [4219] accepts the command [4804], the set/write section [902] of the multi-data-length management entity [4219] writes [4802] the setting (extended data length (L4)) into the routing table-2 [4220] via the routing table write AP tool. As a result, the data length entry in the routing table-2 [4220] changes from L1 to LA [5004] as shown in FIG. 27(B).

FIG. 28 is a diagram that illustrates changing the existing data length information on the server in the system model shown in FIG. 24. That is, FIG. 28 depicts the process of adding another data length setting on the server [4201] in response to a request for data length addition sent from the backup server [4202] to the server [4201]. First, the data length change request sending section [905] included in the multi-data-length management entity [4219] of the backup server [4202] generates a data length change request packet [5108].

FIG. 35(B) shows the structure of the data length change request packet that is used to add another data length setting. As shown in FIG. 35(B), the data length change request packet [5108] contains address 2 [6201] as the request issuer address and L4 [6202] as data length to override the existing. After generated, the data length change request packet [5108] is delivered through the TCP/UDP [4215] and IP [4216] to the driver [4217] and sent through the network interface card [4222] over the LAN [4204] to the destination. On receiving the data length change request packet [5108], the network interface card [4218] of the server [4201] stores the packet [5108] into the receive data buffer (the receive data buffer 1003 in FIG. 7(B)) of the multi-data-length receiving entity [4209]. The management table read section (the management table read section 1001 in FIG. 7(B)) of the multi-data-length receiving entity [4209] searches the multi-data-length management table [4213] with the search key of the sender address (address 2 in this example) from the packet [5108]. As a result, data length (L1 [4503]) and receive I/F with driver [4504] are obtained. The multi-data-length receiving entity [4209] delivers the packet [5108] to the driver [4208] via the receive I/F with driver [4504]. The packet [5108] is forwarded from the virtual driver [4208] though the IP [4207] and TCP/UDP [4206] to the multi-data-length management entity [4210]. When receiving the data length change request packet [5108], the data length change request receiving section [903] included in the multi-data-length management entity [4210] looks up the request issuer address (address 2 in this example) [6201] and data length to override the existing (L4 in this example) [6202] in the packet [5108]. Because the server [4201] is equipped with only the driver [4201] that is for normal data length for address 2, creating a virtual driver and changing the existing setting are carried out. The virtual driver creating section [904] creates a virtual driver [5102] in the same hierarchy where the driver [4208] exists via the driver create AP tool [5107] and the link setup table creating section [906] creates a link setup table-1*b* [5106] on the virtual driver [5102] via the link setup table create AP tool [5104].

Then, the set/write section [902] writes [5104] the setting (extended data length (L4)) into the link setup table-1*b* [5106] via the link setup table write AP tool and writes [5105] the same into the routing table-1 [4211] via the routing table write AP tool. Lastly, the setting (extended data length (LA)) is written into the multi-data-length management table [4213], then the process of adding another data length setting is complete. As a result, the link setup table-1*b* [5106] is added that contains address 1 [5201] as the device ID address entry, L4 [5202] as the data length entry, and statistics [5203] such as the count of the data sent and received via the virtual driver. As shown in FIG. 29(B), among the entries [5301] for the backup server [4202] in the routing table-1 [4211], the entry of upward I/F with driver changes from send I/F with driver to send I/F with virtual driver [5304] and the entry of data length changes from L1 to LA [5305]. As shown in FIG. 29(C), among the entries [5401] for the backup server [4202] in the multi-data-length management table [4213], the data length entry changes from L1 to LA [5403].

By thus adding the virtual driver [5102] and the link setup table-1B [5106] and changing the settings in the tables, the length of the data to be transferred between the server [4201] and the backup server [4202] is extended from L1 to L4 after the processing of the change.

In the foregoing description of embodiments, it was assumed that creating and writing setting into a virtual driver and a link setup table and writing settings into a routing table be executed by using one of the standard tools of the AP. If the AP does not has the tools for creating a virtual driver and a table and writing settings, another embodiment of the present invention can be applied by using a direct writing method, for example, the method in which the multi-data-length management entity writes settings into the multi-data-length management table.

Figure 30:
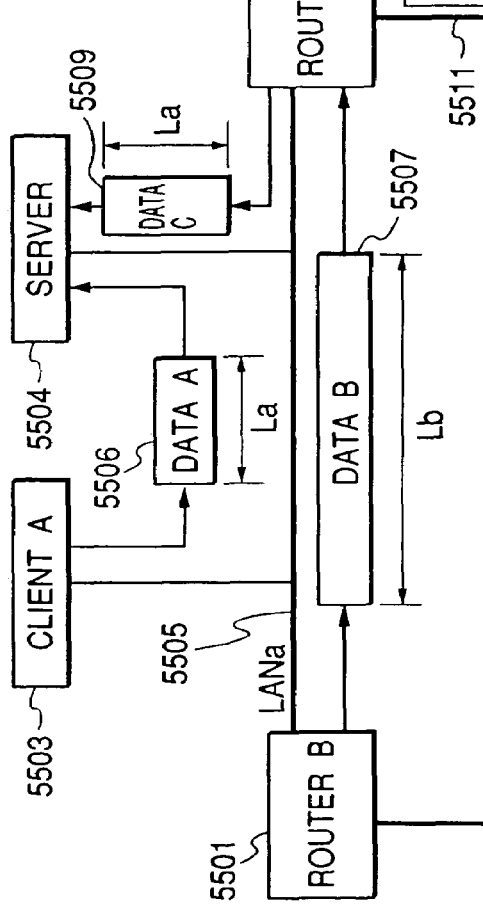
FIG. 30 is a diagram showing the configuration of a system model including routers of an embodiment of the present invention and illustrating data flow.

Although the foregoing description of some of the embodiments was made, using information system's terminals such as PCs or WSs (as clients and servers) as examples, the invention can be applied to networking devices (such as routers, LAN switches, and gateways) to which the terminals are connected. FIG. 30 is a diagram showing the configuration of a system model including routers of an embodiment of the present invention and illustrates a data flow. This embodiment is a network system in which two routers (router A [5502] and router B [5501]), client A [5503], and a server [5504] are interconnected via LAN-a [5505] and client B [5510] and router A [5502] are connected via LAN-b [5511]. The following discusses the application of the invention to the router A [5502] and router B [5501]. Here, it is assumed that virtual drivers to be used for communication between the routers have been created by the network administrator beforehand. It is also assumed that a setting to deliver a packet to be transmitted between the routers (the packet having the address of the other end router of the path as the sender address) to the virtual driver has been registered in the multi-data-length management table. Extended data length (Lb) is assumed to have been written into the routing tables and link setup tables of both routers. Data transfer is performed between the router A [5502] and the router B [5501], the client A [5503] and the server [5504] (over the LAN-a [5505]), and the client B [5510] and the server [5504] (over the LAN-a [5505] and the LAN-b [5511] via the router A [5502]). Standard maximum frame data length defined for the LAN-a [5505] and the LAN-b [5511] is assumed to be La. Thus, the length of data A [5506] to be transmitted between the client A [5503] and the server [5504] and the length of data C [5508] to be transmitted between the client B [5510] and the server [5504] are La. On the other hand, the length of data B [5507] to be transmitted between the router [A] and the router [B] is set at Lb by application of an embodiment of the present invention. It is thus made possible that the routers communicate with each other in extended data length mode, while the client and the server communicate with each other in standard data length mode. The present invention would be very useful, for example, in a situation where routing information is periodically exchanged between the routers, when a large volume of data must be exchanged due to that Internets have worldwide connections.

Figure 31:
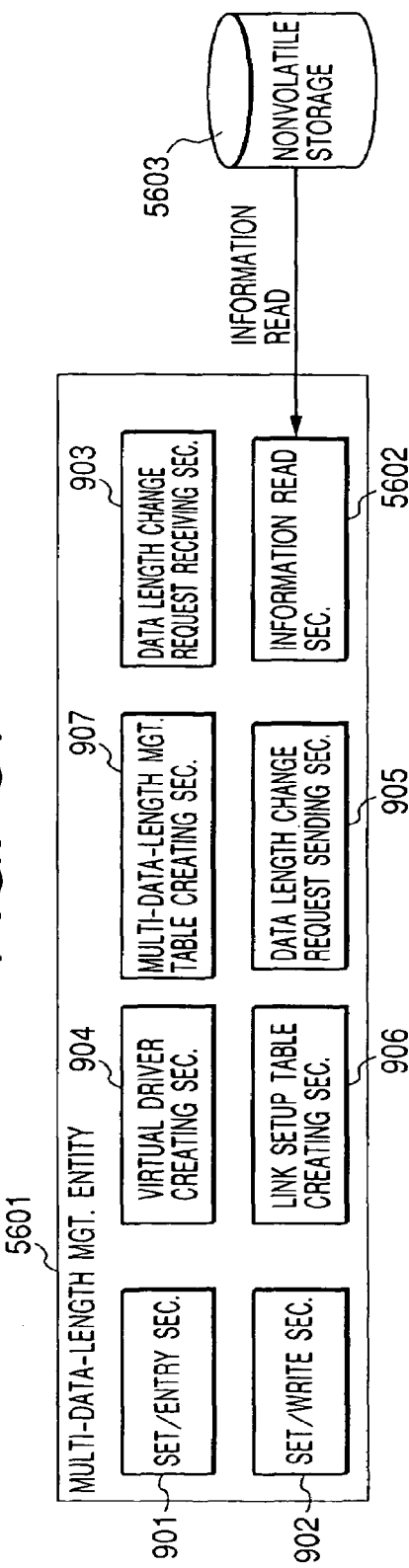
FIG. 31 shows the structure of the multi-data-length management entity configured to enable the entity to read extended data length information from nonvolatile storage.

In the foregoing description of some of the embodiments, it was assumed that creating and writing setting into a virtual driver and a link setup table and writing settings into a multi-data-length management table and a routing table be carried out by the network administrator when the device is booted via the multi-data-length management entity. However, the same result can be produced without the intervention of the network administrator's entry action in the following way: i.e., the information on the required settings is stored in advance into nonvolatile storage (its contents are not erased even when the power supply is off) such as a hard disk and the multi-data-length management entity reads the information when the device is booted, with a proper period or at proper timing. FIG. 31 shows the structure of the multi-data-length management entity configured to enable the entity to read extended data length information from nonvolatile storage. That is, this diagram depicts the structure of the multi-data-length management entity [5601] that reads the stored information out of nonvolatile storage [5603]. Difference from the structure of the multi-data-length management entity [811] shown in FIG. 7(A) is that an information read section [5602] is added. The information read section [5602] reads information from the nonvolatile storage [5603] at any given timing.

The foregoing description of some of the embodiments discussed example cases where the number of sets of entries in the multi-data-length management table equals the number of the other end devices that the communication device that holds the above table is to communicate with. This is because all sender addresses of the other end devices that the communication device is to communicate with in standard data length mode and all sender addresses of the other end devices that the communication device is to communicate with in extended data length mode must be registered in the table. For a large-scale network, however, the number of the other end devices that the communication device communicates with would be so many that a great number of entries would be registered in the multi-data-length management table.

Figure 32:
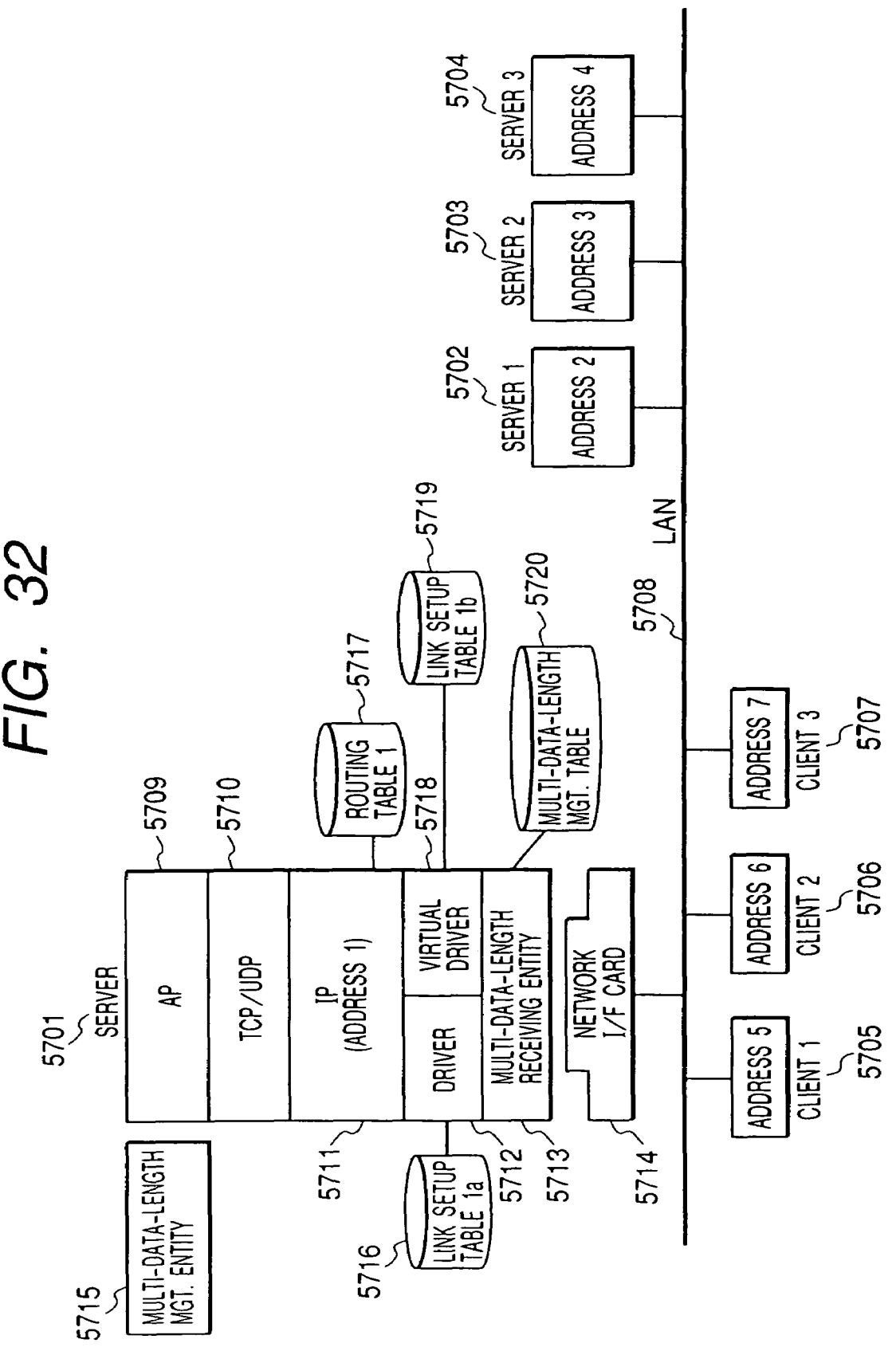
FIG. 32 is a diagram illustrating an embodiment of the invention where the entries in the multi-data-length management table are limited to the information about extended data length.

FIG. 32 is a diagram illustrating an embodiment of the invention where the entries in the multi-data-length management table are limited to the information about extended data length. In such a network system model as shown in FIG. 32, a server [5701] is to communicate with, for example, a backup server 1 [5702], a backup server 2 [5703], a backup server 3 [5704], a client 1 [5705], a client 2 [5706], and a client 3 [5707]. It is assumed that the server communicates with all clients in standard data length mode and with all backup servers in extended data length mode with only one extended data length setting. If the multi-data-length management table [5720] contains as many sets of entries as the devices that the server is to communicate with, that is, it contains six sets of entries, its structure is as shown in FIG. 33(A).

Generally, the number of clients is considerably greater than the number of backup servers, which results in a problem that the storage required for storing the above table swells and thus searching time will be longer.

Figure 34:
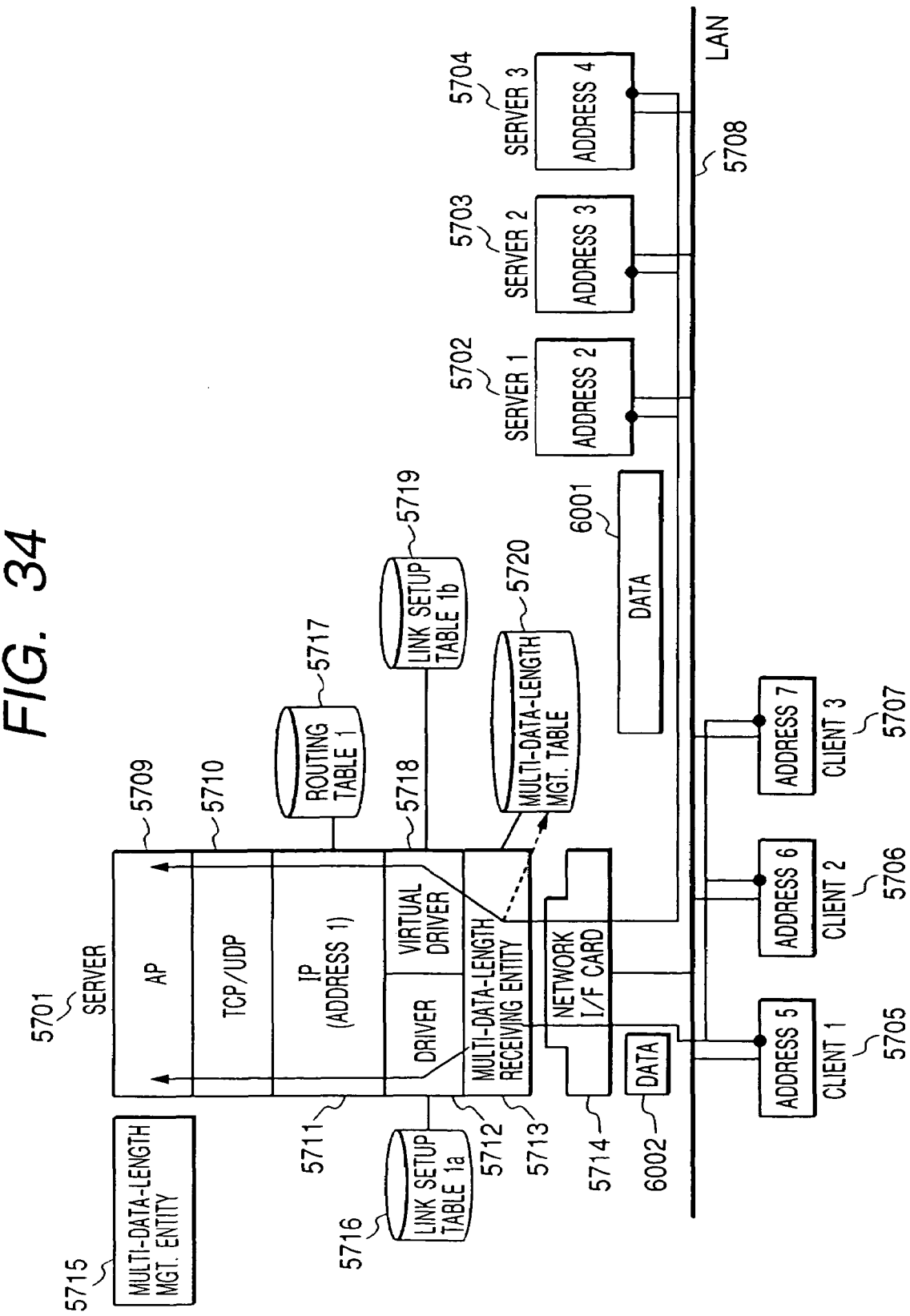
FIG. 34 is a diagram illustrating data flow between the server, backup server, and client in the system model shown in FIG. 32.

Then, the following discusses an embodiment for avoiding this problem, using FIGS. 33(B) and 34.

FIG. 33(B) shows the structure of the multi-data-length management table in which the entries about extended data length are registered in the system shown in FIG. 32. As shown in FIG. 33(B), the entries registered in the multi-data-length management table [5720] are only about the sender addresses of the other end devices that the server is to communicate with. Specifically, only the entries of the server 1 [5702], server 2 [5703], and server 3 [5704] are registered. As shown in FIG. 34, the multi-data-length receiving entity [5713] searches the multi-data-length management table [5720] with the search key of the sender address of the received data and distributes the received data to the appropriate virtual driver [5718] if the search hits the appropriate entry. If not, the multi-data-length receiving entity [5713] judges that the data has been transmitted in standard data length mode and distributes the data to the driver [5712]. In the case of FIG. 34, data [6001] that has been transmitted from any of the other three servers is distributed to the virtual driver [5718] and data that has been transmitted from any of the clients is distributed to the driver [5712].

Next, automatic data length change will be discussed below. The foregoing description of the present invention discussed cases where a "person" manually changes data length. Generally speaking, when the data quantity being transmitted on a line has increased, the transfer efficiency is improved by temporarily setting the data frame length shorter from the viewpoint of the network system as a whole. An embodiment of the invention to detect the increased data quantity and perform automatic data length change (to shorter data length) will be explained below.

The following discusses an example of the operation of a network system model, of an embodiment of the present invention, wherein data length for transmission automatically changes without the intervention of the operator, using FIGS. 36, 37, 38, 39, 40, and 7. In this embodiment of the invention, the network system model is discussed, as an example on the assumption that extended data length (L2) has been set in addition to standard data length (L1). It is also assumed that extended data length (L2) is reduced to standard data length (L1) by data length change.

Figure 36A:
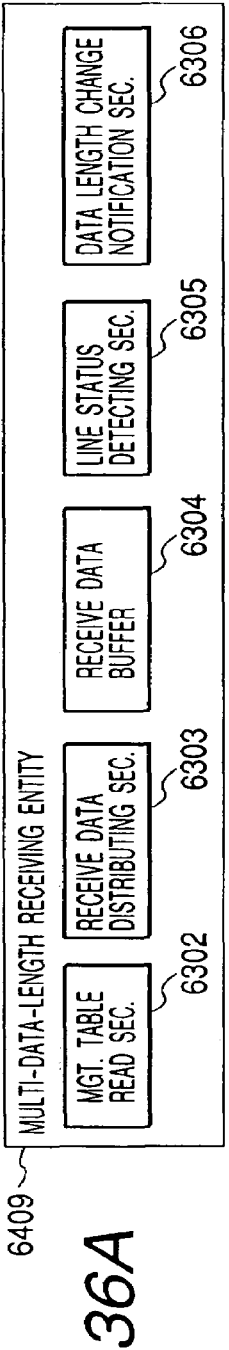
FIGS. 36A and 36B show the structure of the multi-data-length receiving entity of an embodiment of the invention and depicts an example network system model.
Figure 36B:
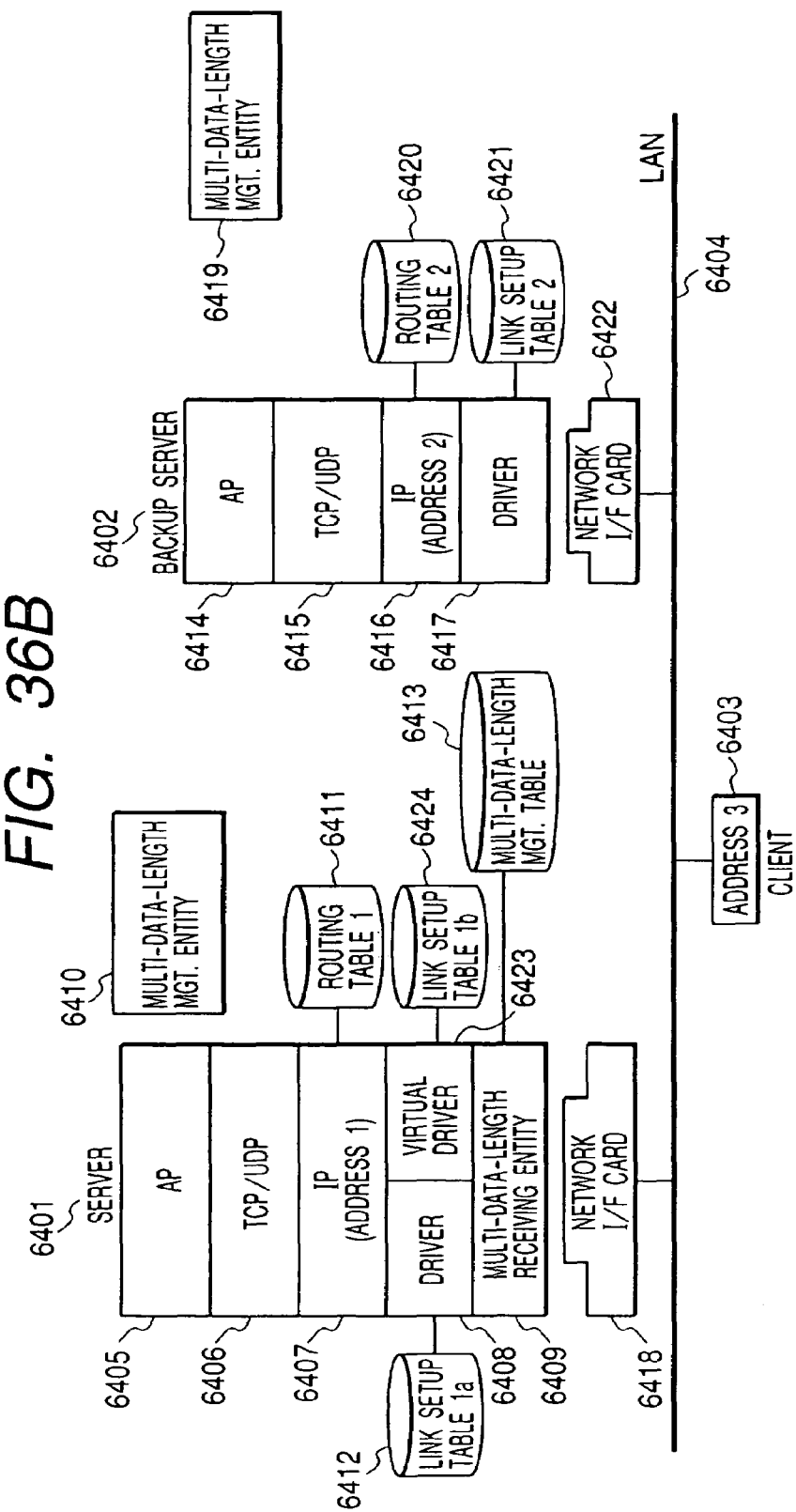

FIG. 36(B) is a diagram depicting the above network system model, to which an embodiment of the present invention is applied, wherein the system is configured with a server having a multi-data-length management entity, a backup server having a multi-data-length management entity, and a client. The server [6401], which may be, for example, a WWW server, a mail server, or a file server, will usually communicate with a client [6403] via a LAN [6404]. The client [6403] issues a request for service to the server [6401] via the LAN [6404] and receives the service. The backup server [6402] periodically backs up of the data on the server [6401] via the LAN [6404]. These devices are interconnected via the LAN [6404] and the standard data length defined for the LAN [6404] is assumed to be L1 in this example. It is also assumed that the communication between the server [6401] and the client [6403] is performed in standard data length (L1) mode and the communication between the server [6401] and the backup server [6402] is performed in extended data length (set at L2) mode.

Using FIGS. 36 and 37, the structures of the devices will be described below. However, the structure of the client [6403] is the same as that described with FIGS. 9 and 11 and therefore its explanation will not be repeated. As shown in FIG. 36 (B), the server [6401] is composed of modules arranged in hierarchical structure, having AP [6405] on the top hierarchy and a multi-data-length management entity [6410], TCP/UDP [6406], IP [6407], a driver [6408], a virtual driver [6423], a multi-data-length receiving entity [6409], and a network interface card [6418] descending in the mentioned order. FIG. 36(A) shows the structure of the multi-data-length receiving entity [6409] part of an embodiment of the invention. The multi-data-length receiving entity [6409] includes a line status detecting section [6305] and a data length change notification section that notifies the multi-data-length management entity [6310] of data length change, in addition to the management table read section [6302], receive data distributing section [6303], and receive data buffer [6304] as described with FIG. 7(B). (For the details of the modules other than the receiving entity, refer to the description of the overall structure diagram using FIG. 6.) The IP [6407] holds a routing table-1 [6411] and is assigned address 1.

The structure of the routing table-1 [6411] is shown in FIG. 37(A). In the case of the network system model shown in FIG. 36(B), because the other end devices that the server [6401] is to communicate with are the client [6403] (address 3) and the backup server [6402] (address 2), the routing table-1 [6411] contains two sets of entries. The following are registered in the routing table-1 [6411]: the entries [6505] for the client [6403] that are address 3 [6501] as the destination address, address 3 [6502] as the NextHop address, send I/F with driver [6503] as the upward 1F with driver, and L1 [6504] as the data length; and the entries [6506] for the backup server [6402] that are address 2 [6507] as the destination address, address 2 [6508] as the NextHop address, send I/F with virtual driver [6509] as the upward I/F with driver, and L2 [6510] as the data length. The driver [6408] that is used for communication in standard data length mode holds a link setup table-1a [6412].

The multi-data-length receiving entity [6409] holds a multi-data-length management table [6413]. The structure of the multi-data-length management table [6413] is shown in FIG. 37(B). In the case of the network system model shown in FIG. 36 (B), because the other end devices that the server [6401] must communicate with after selecting appropriate data length are the client [6403] (address 3) and the backup server [6402] (address 2), the multi-data-length management table [6413] contains two sets of entries. The following are registered in the multi-data-length management table [6413]: the entries [6601] for the client [6403] that are address 3 [6602] as the sender address, L1 [6603] as the data length, and receive I/F with driver [6604] as the downward I/F with driver; and the entries [6605] for the backup server [6402] that are address 2 [6606] as the sender address, L2 [6607] as the data length, and receive I/F with virtual driver [6608] as the downward I/F with driver.

The structure of the link setup table-1a [6412] is shown in FIG. 37(C). The link setup table-1a [6412] contains address 1 [6701] as the device ID address entry, L1 [6702] as the data length entry, and statistics [6703] such as the count of the data sent and received through the driver. The virtual driver [6423] that is used for communication in extended data length mode holds a link setup table-1b [6424]. The structure of the link setup table-1b [6424] is shown in FIG. 37(D). The link setup table-1b [6424] contains address 1 [6801] as the device ID address entry, L2 [6802] as the data length entry, and statistics [6803] such as the count of the data sent and received through the virtual driver.

As is the case with the above server [6401], the backup server [6402] is also composed of modules arranged in hierarchical structure, having AP [6414] on the top hierarchy and a multi-data-length management entity [6419], TCP/UDP [6415], IP [6416], a driver [6417], and a network interface card [6422] descending in the mentioned order (for the details of the modules, refer to the description of the overall structure diagram using FIG. 6). The IP [6416] holds a routing table-2 [6420] and is assigned address 2.

The structure of the routing table-2 [6420] is shown in FIG. 37(E). In the case of the network system model shown in FIG. 36(B), because the other end device that the backup server [6402] is to communicate with is the server [6401] (address 1), the routing table-2 [6420] contains one set of entries. The following are registered in the routing table-2 [6420]: address 1 [6901] as the destination address, address 1 [6902] as the NextHop address, send I/F with driver [6903] as the upward I/F with driver, and L2 [6904] as the data length. The driver [6417] that is used for communication in extended data length (L2) mode holds a link setup table-2 [6421]. The structure of the link setup table-2 [6421] is shown in FIG. 37(F). The link setup table-2 [6421] contains address 2 [7001] as the device ID address entry, L2 [7002] as the data length entry, and statistics [7003] such as the count of the data sent and received through the driver.

Figure 38:
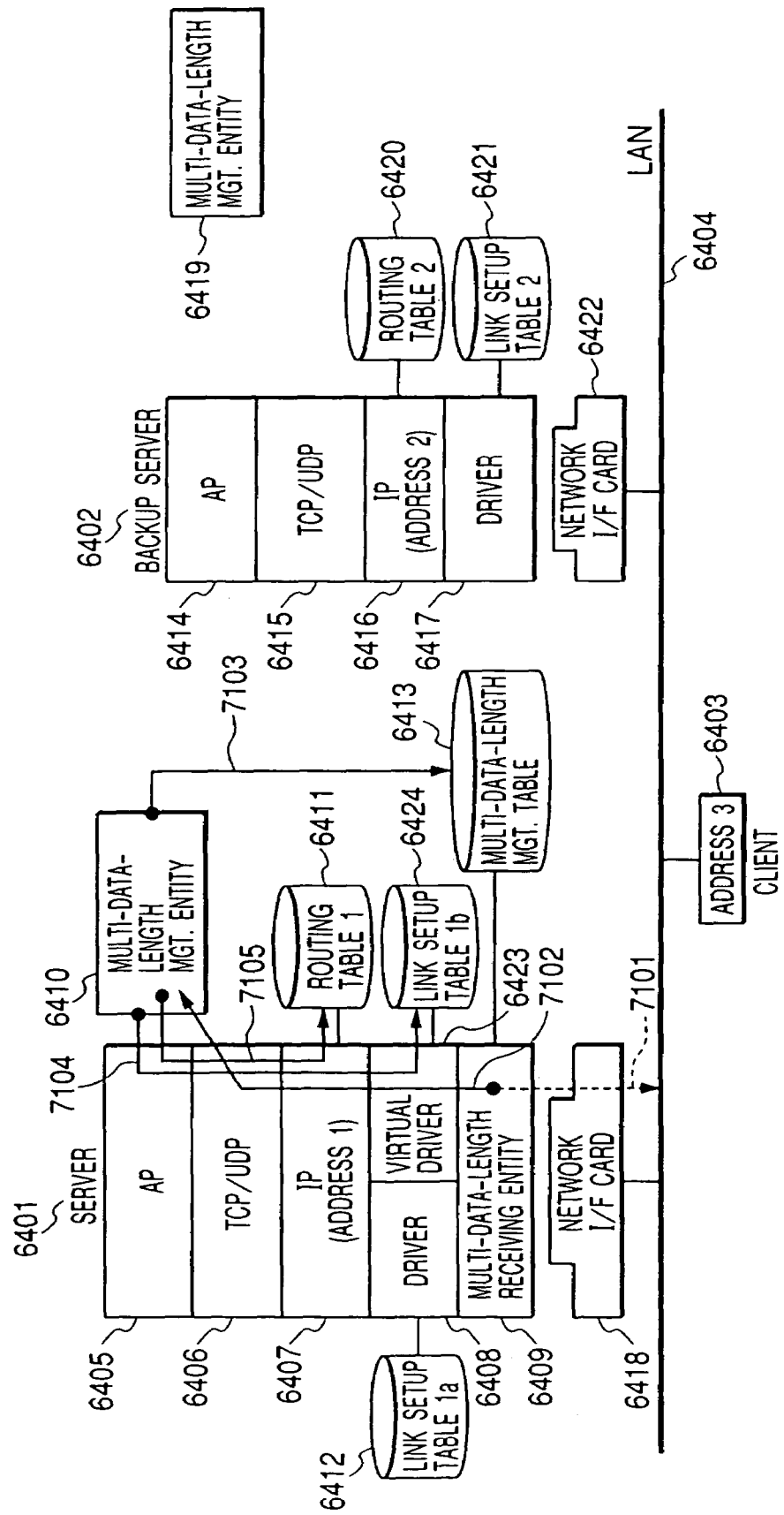
FIG. 38 is a diagram illustrating the process of changing the existing data length setting on the server in the system model shown in FIG. 36.

Then, the process of changing the existing data length setting will be explained below, using FIGS. 36, 38, 39, 40, and 7. FIG. 38 is a schematic diagram illustrating the process of changing the existing data length setting (from L2 to L1) on the server [6401]. First, the operation of updating the tables on the server [6401] will be explained. The line status detecting section [6305] of the multi-data-length receiving entity [6409] monitors for line status notification posted to the OS from the network interface card [6418] and detects a "congested" line status from notification [7101]. On detecting the congested status, the line status detecting section [6306] notifies the data length change notification section [6306] of the multi-data-length receiving entity [6409] that data length change is required. When notified of that, the data length change notification section [6306] requests the multi-data-length management entity [6410] to change the existing data length setting [7102].

When the multi-data-length management entity [6410] receives the request, its set/write section [902] writes [7104] another setting (reduced data length (L1)) into the link setup table-1b [6424] via the link setup table write AP tool. As a result, the data length entry in the link setup table-1b [6424] changes from L2 to L1 [7501], as shown in FIG. 40(C). Then, the set/write section [902] of the multi-data-length management entity [6410] writes [7105] the setting (reduced data length (L1)) into the routing table-1 [6411] via the routing table write AP tool. As a result, the data length entry in the routing table-1 [6411] changes from L2 to L1 [7301], as shown in FIG. 40 (A). Lastly, the set/write section [902] of the multi-data-length management entity [6410] writes [7103] the setting (reduced data length (L1)) into the multi-data-length management table [6423] via the multi-data-length management table write AP tool, when a spell of update operation on the server [6401] is complete. As a result, the data length entry in the multi-data-length management table [6413] changes from L2 to L1 [7401], as shown in FIG. 40(B).

Then, the operation of updating the tables on the backup server [6402] will be explained below. FIG. 39 is a schematic diagram illustrating the process of changing the existing data length on the backup server [6402] in response to a request for data length change (from L2 to L1 in this example) sent from the server [6401] to the backup server [6402]. First, the data length change request sending section [905] included in the multi-data-length management entity [6410] of the server [6401] creates a data length change request packet [7201]. As shown in FIG. 40(F), the data length change request packet [7201] contains address 1 [7801] as the request issuer address and L1 [7802] as data length to override the existing. After generated, the data length change request packet [7201] is delivered through the TCP/UDP [6406] and IP [6407] to the virtual driver [6423] and sent through the network interface card [6418] over the LAN [6404] to the destination. On arriving at the backup server [6402] via the LAN [6404], the data length change request packet [7201] is forwarded through the network interface card [6422], driver [6417], IP [6416], and TCP/UDP [6415] to the multi-data-length management entity [6419].

When receiving the data length change request packet [7201], the data length change request receiving section [903] included in the multi-data-length management entity [6419] looks up the request issuer address (address 1 in this example) [7801] and data length to override the existing (L1 in this example) [7802] in the packet [7201]. Because the backup server [6402] is equipped with the driver [6417] and the link setup table-2 [6421] that are for extended data length (L2), changing the existing setting is carried out. First, the set/write section [902] writes [7203] the setting (reduced data length (L1)) into the link setup table-2 [6424] via the link setup table write AP tool. Similarly, the set/write section [902] writes [7204] the setting into the routing table-2 [6420] via the routing table write AP tool. Then, the data length setting change is finished. As a result, the data length entry in the link setup table-2 [6424] changes from L2 to L1 [7701] as shown in FIG. 40(E) and the data length entry in the routing table-2 [6420] also changes from L2 to L1 [7601] as shown in FIG. 40(D).

The line status detecting section [6305] of the multi-data-length receiving entity [6409] initiates the data length change processing, according to the status of the line (LAN [6404]), thereby changing the appropriate settings in the tables, as described above. After the change processing, the length of the data to be transferred between the server [6401] and the backup server [6402] is reduced from L2 to L1. Although the above explanation of the embodiment discussed an example case where data length is reduced L2 to L1, data length can be extended in the same way by the decision of the line status detecting section [6305] of the multi-data-length receiving entity [6409].

In the foregoing explanation of embodiments discussed example cases where a LAN is used as a network for connecting information systems' terminals and networking devices. The present invention, however, can be applied in the same way to any network other than LAN, provided that communication via the network is performed with pre-defined maximum frame data length frames and that the networked terminals and networking devices hold such information as routing to the other ends of all transmission paths (or groups of other ends of all transmission paths).

The foregoing embodiments were illustrated using IP networking. The present invention, however, can be applied to other suitable networks, provided that the network environments satisfy the following requirements:

(1) Networked information systems' devices and networking devices are assigned address (identifier).
(2) All devices hold routing information based on their address and computes routing with the search key of address.
(3) All devices exchange data with each other via a line or lines for which the maximum frame data length specific to a line is defined.

Although the foregoing explanation discussed example cases where the multi-data-length management table and the routing table are separately prepared, these tables may be integrated into one table. If an integrated table is used, the entries of the table may be organized such that the sender address, downward I/F with driver, data length entries of the multi-data-length management table conjoin with the address, upward I/F with driver, and data length entries of the routing table, respectively.

By applying embodiments of the present invention to information systems' terminals such as those operating as either servers or clients and networking devices such as routers and LAN switches, the following are uses provided by some of the embodiments:

(1) A plurality of the terminals and devices connected to a single LAN can communicate with each other in different modes of multiple data length settings.
(2) During the communication in predefined standard data length mode, extended data length can be set for a terminal-to-terminal or device-to-device communication path and communication in extended data length mode can be accomplished.
(3) During the communication in preset extended data length mode, another extended data length can be set for a terminal-to-terminal or device-to-device communication path and communication in another extended data length mode can be implemented. Data length extension increases the data transfer efficiency, further resulting in that the count of receive notification to be posted from the network interface card to the driver on the receiving end can be reduced, and therefore the load on the receiving terminal or device can be decreased.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

The preceding has been a description of the preferred embodiment of the invention. It will be appreciated that deviations and modifications can be made without departing from the scope of the invention, which is defined by the appended claims.

What is claimed is:

1. A communications management device for sending data over a network, comprising:
   a routing table comprising, a destination address, a first data length for disassembling based on said destination address, and a send interface;
   a send data preparation entity that selects said first data length and said send interface using said destination address in said routing table, and disassembles data to said first data length;
   a first driver associated with said send interface for sending said data disassembled to said first data length over said network;
   a multi-data-length management entity that sets or changes said first data length in said routing table;
   a multi-data-length management table comprising a sender address of receive data, a second data length based on said sender address, and a receive interface with a second driver;
   a multi-data-length receiving entity that selects said second data length and said receive interface with said second driver using said sender address of receive data in said multi- data-length management table; and
   wherein said receive interface with said second driver receives said receive data with said second data length.

2. The communication management device according to claim 1 wherein said first data length is a standard data length.

3. The communication management device according to claim 1 wherein said first data length is an extended data length.

4. The communication management device according to claim 1 wherein said second data length is an extended data length.

5. A communications management device for sending data over a network, comprising:
- a routing table comprising, a destination address, a first data length for disassembling based on said destination address, and a send interface;
- a send data preparation entity that selects said first data length and said send interface using said destination address in said routing table, and disassembles data to said first data length;
- a first driver associated with said send interface for sending said data disassembled to said first data length over said network; and
- a multi-data-length management entity that sets or changes said first data length in said routing table, wherein the multi-data-length management entity further comprises a virtual driver creating section that creates a virtual driver in the same hierarchy where said first driver exists and creates a link setup table associated with said virtual driver, wherein said virtual driver executes communication with a related specified data length.

6. A communications management device for sending data over a network, comprising:
- a routing table comprising, a destination address, a first data length for disassembling based on said destination address, and a send interface;
- a send data preparation entity that selects said first data length and said send interface using said destination address in said routing table, and disassembles data to said first data length;
- a first driver associated with said send interface for sending said data disassembled to said first data length over said network; and
- a multi-data-length management entity that sets or changes said first data length in said routing table,
- wherein the multi-data-length management entity includes a virtual driver creating section that creates a virtual driver; a link setup table creating section that creates a link setup table associated with the virtual driver; and a multi-data-length management table creating section that creates a multi-data-length management table associated with a multi-data-length receiving entity; and
- wherein the virtual driver executes sending/receiving of data with a dynamically modifiable data length.

7. A communications management device for sending data over a network, comprising:
- a routing table comprising, a destination address, a first data length for disassembling based on said destination address, and a send interface;
- a send data preparation entity that selects said first data length and said send interface using said destination address in said routing table, and disassembles data to said first data length;
- a first driver associated with said send interface for sending said data disassembled to said first data length over said network; and
- a multi-data-length management entity that sets or changes said first data length in said routing table,
- wherein the multi-data-length management entity changes an existing data length; after receiving a request to change the existing data length, and
- wherein the request includes a request issuer address and another data length for overriding the existing data length.

8. The communication management device according to claim 7 wherein:
- the multi-data-length management entity further includes:
- a data length change request receiving section that receives the request.

9. A communications management device for sending data over a network, comprising:
- a routing table comprising, a destination address, a first data length for disassembling based on said destination address, and a send interface;
- a send data preparation entity that selects said first data length and said send interface using said destination address in said routing table, and disassembles data to said first data length;
- a first driver associated with said send interface for sending said data disassembled to said first data length over said network; and
- a multi-data-length management entity that sets or changes said first data length in said routing table,
- wherein the multi-data-length management entity comprises a multi-data-length management table and a multi-data-length receiving entity; only sender addresses of other end devices with other than a predetermined data length are stored in the multi-data-length management table; and
- wherein the multi-data-length receiving entity forwards the received data from a sender whose information is not stored into the multi-data-length management table to a predetermined receive interface with driver.

10. A communications management device for sending data over a network, comprising:
- a routing table comprising, a destination address, a first data length for disassembling based on said destination address, and a send interface;
- a send data preparation entity that selects said first data length and said send interface using said destination address in said routing table, and disassembles data to said first data length;
- a first driver associated with said send interface for sending said data disassembled to said first data length over said network; and
- a multi-data-length management entity that sets or changes said first data length in said routing table; and a line status detecting section that detects network operating status and notifies a further processing section that change of an existing data length is required, depending on the network operating status,
- wherein the multi-data-length management entity changes the existing data length according to a notification posted from the line status detecting section.

11. A communication management method comprising:
a multi-data-length management entity setting or changing:
- a first data length in a first table, the first table comprising a destination address, the first data length, and a send interface with driver, the first data length in a second table, the second table comprising, a device ID address and the first data length, and the send interface with driver;

using the first table, selecting the first data length and associated send interface with driver based on a destination address of send data; and transmitting the send data over a network using the send interface with driver, according to the first data length stored in the second table.

12. The communication management method according to claim 11 comprising:

the multi-data-length management entity setting or changing a second data length in a third table comprising, a sender address, said second data length, and a receive interface with driver;

using said third table, the multi-data-length management entity selects said second data length and associated receive interface with driver, based on said sender address; and receiving receive data via a network through the receive interface with driver, wherein, said receive data is transmitted from said sender address in a frame of predetermined data length.

13. The communication management method according to claim 11 further comprising creating a virtual driver to execute communication in a specified data length mode and creating a link setup table associated with the virtual driver.

* * * * *